(12) United States Patent
Gassner et al.

(10) Patent No.: US 12,443,578 B1
(45) Date of Patent: Oct. 14, 2025

(54) SYSTEMS AND METHODS FOR A DATABASE ARCHIVE

(71) Applicant: Veeva Systems Inc., Pleasanton, CA (US)

(72) Inventors: Peter Gassner, Pleasanton, CA (US); Jonathan Stone, Olympia, WA (US); Andrew Han, Needham, MA (US); Graham Gelwicks, San Francisco, CA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/086,607

(22) Filed: Mar. 21, 2025

(51) Int. Cl.
*G06F 16/215* (2019.01)
*G06F 16/21* (2019.01)
*G06F 16/23* (2019.01)

(52) U.S. Cl.
CPC .......... *G06F 16/219* (2019.01); *G06F 16/215* (2019.01); *G06F 16/2358* (2019.01)

(58) Field of Classification Search
CPC ....... G06F 16/219; G06F 16/215; G06F 16/23
See application file for complete search history.

(56) References Cited

U.S. PATENT DOCUMENTS

| 2012/0233134 A1* | 9/2012 | Barton | G06F 16/162 |
| | | | 707/E17.005 |
| 2021/0374118 A1* | 12/2021 | Kim | G06F 16/278 |

* cited by examiner

*Primary Examiner* — Maher N Algibhah

(57) ABSTRACT

A method for archiving data records in an archive repository includes retrieving, in response to: the first multiple of change data records of a first repository including at least the first threshold number of change data records and a second repository including the second multiple of change data records including at least the second threshold number of change data records, the second multiple of change data records of the second repository. The first repository and the second repository are configured to store data records. The method further includes generating multiple change files and storing the multiple change files in the archive repository. The archive repository is configured to store data files. The method further includes storing a second change data record in the second repository.

20 Claims, 14 Drawing Sheets

Audit trail for Feature: Internal Feature: Scalable Audit Trail (Continued) — 1100, 1104

Include related objects — 1108

Timestamp — 1116 all — 1112

⊕ Add filter — 1120

Apply — 1124

Showing events for 24 Jan 2014 to 25 Sep 2024 (35 results) — 1130

| Timestamp (dd MMM yyyy) | User Name | Event Description | Record |
|---|---|---|---|
| 13 Sep 2024 12:26 PM PDT | System on behalf of adam.mcmillan@veeva.com | "GR Current Release" set to "false" | Feature: Internal Feature: Scalable Audit Trail (Continued) |
| 05 Sep 2024 1:37 PM PDT | java_sdk_service@veeva.com on behalf of graham.gelwicks @veeva.com | "Estimated Developer-Sprints" changed from "7" to "5" | Feature: Internal Feature: Scalable Audit Trail (Continued) |
| 04 Sep 2024 7:51 PM PDT | adam.mcmillan@veeva.com | "Exec Priority" set to "false" | Feature: Internal Feature: Scalable Audit Trail (Continued) |
| 07 Aug 2024 1:43 PM PDT | System | "Feature Move to On Plan" workflow completed | Feature: Internal Feature: Scalable Audit Trail (Continued) |
| 07 Aug 2024 1:43 PM PDT | System | "Last Planned Release" set to "25R1" | Feature: Internal |

Close

| | | | |
|---|---|---|---|
| Admin \| Logs Users & Groups Configuration Operations Connections | | | |

LOGS
- System Audit History
- Login Audit History
- Document Audit History
- Object Record Audit History
- Domain Audit History
- Vault Java SDK Logs
- API Usage Logs
- Queue Logs
- Email Log
- Collaborative Authoring Error Log

Object Record Audit History ⓘ 1208

Timestamp ▼ | Is in the range ▼ | 10 Sep 2021 | to | 13 Sep 2024 | Apply 1220

⊕ Add filter — 1216

Showing events for 10 Sep 2021 to 13 Sep 2024 (100000+ results)

| Timestamp (dd MMM yyyy) | User Name | Item | Event Description |
|---|---|---|---|
| 13 Sep 2024 9:01 PM PDT | System | Report: RIA Feature Record Changes | "Last Ran" changed from "2024-09-13T04:00:57.000Z" to "2024-09-14T04:01:34.000Z" |
| 13 Sep 2024 9:01 PM PDT | System | Report: Incomplete Platform Features 24R2 | "Last Ran" changed from "2024-09-13T04:00:49.000Z" to "2024-09-14T04:01:26.000Z" |
| 13 Sep 2024 8:48 PM PDT | System | Performance Statistics : 2024-09-13 | Performance Statistics : 2024-09-13 created |
| 13 Sep 2024 7:34 PM PDT | System on behalf of bob.kenney @veeva.com | Permalink: PM-008676 | Permalink : PM-008676 created |
| 13 Sep 2024 5:57 PM PDT | System on behalf of adam.mcmillan @veeva.com | Development Team> Dev Team Dependency <Feature: DVA> DVA-Smart Curser for Embedded Link Navigation <Smart Cursor for Embedded Link Navigation | "Feature State" changed from "On Plan" to "Complete" |
| 13 Sep 2024 5:57 PM PDT | System | Envelope Content: Object Content: CONTENT-000006673 | "Status" changed from "Active" to "Inactive" |
| 13 Sep 2024 5:57 PM PDT | System | Envelope Content: Object Content: CONTENT-000006673 | "Lifecycle State" changed from "Active" to "Inactive" |
| 13 Sep 2024 5:57 PM PDT | System | Envelope: All Envelope: Feature Move to Complete-14 Sep 2024 | "Status" changed from "Active" to "Inactive" |
| | | Envelope: All Envelope: Feature Move to Complete-14 | "Lifecycle State" changed from |

SYSTEMS AND METHODS FOR A DATABASE ARCHIVE

TECHNICAL FIELD

The present disclosure relates to systems and methods for a database archive.

BACKGROUND

Researchers, scientists, industry players, academics, government regulators, and other stakeholders are increasingly in need of efficient and simple ways to archive data without impacting downstream systems and methods.

SUMMARY

One embodiment relates to method for archiving data records in an archive repository. The method includes modifying a first data record and generating a first change data record based on the modification of the first data record. The method further includes selecting a repository status and storing the first change data record in a first repository based on the repository status. The first repository is configured to store data records. The method further includes determining the first repository includes a first multiple of change data records that includes at least a first threshold number of change data records. The method further includes determining a second repository includes a second multiple of change data records that includes at least a second threshold number of change data records. The second repository is configured to store data records. The first threshold number and the second threshold number are equal. The method further includes retrieving, in response to: the first multiple of change data records of the first repository including at least the first threshold number of change data records and the second repository including the second multiple of change data records including at least the second threshold number of change data records, the second multiple of change data records of the second repository. The method further includes generating multiple change files. Each change file includes at least one change data record of the second multiple of change data records. The archive repository is configured to store data files. The method further includes storing the multiple change files in the archive repository. The method further includes selecting and modifying the repository status. The method further includes modifying a second data record and generating a second change data record based on the modification of the second data record. The method further includes storing the second change data record in the second repository based on the modified repository status.

In some embodiments, the method further includes selecting an archive index file from a third repository. In some embodiments, the third repository includes the repository status. In some embodiments, the method further includes modifying the archive index file based on the multiple change data files and storing the modified archive index file in the third repository.

In some embodiments, the archive index file is modified to identify the at least one change data record in each change data file.

In some embodiments, wherein the archive index file is modified to identify the offset of the at least one change data record in each change data file.

In some embodiments, the method further includes receiving a request for a third plurality of change data records; retrieving the archive index file from the third repository; retrieving at least one change data file of the plurality of change files from the archive repository based on the index file and the request; extracting one or more changes data records from the retrieved at least one change data file based on the index file and the request; and outputting the extracted one or more change data records.

In some embodiments, the first threshold number and the second threshold number are each inclusively between 20 million and 30 million.

In some embodiments, the first change data record includes a user identifier associated with the modification of the first data record and a time associated with the modification of the first data record. In some embodiments the first change record identifies the first data record. In some embodiments, the second change data record includes a user identifier associated with the modification of the second data record and a time associated with the modification of the second data record. In some embodiments, the second change data record identifies the second data record.

In some embodiments, each change file includes only change data records associated with a specific period of time. In some embodiments, the specific period of time is at least one of: a day, a week, or a month.

In some embodiments, the first repository and the second repository are each relational databases configured to store data records. In some embodiments, the archive repository is an object storage repository configured to store data files.

In some embodiments, the archive repository is at least one of: an Amazon S3® data bucket repository, a Microsoft Azure® blob storage repository, a Rackspace Cloud® file repository, and a Google Cloud® storage repository.

In some embodiments, the method further includes deleting, in response to storing the multiple change files in the archive repository, the second multiple of change data records from the second repository.

Another embodiment relates to method for archiving data records in an archive repository. The method includes modifying a first data record and generating a first change data record based on the modification of the first data record. The first change data record includes a user identifier associated with the modification of the first data record and a time associated with the modification of the first data record. The first change record identifies the first data record. The method further includes storing the first change data record in a first repository. The first repository is configured to store data records. The method further includes determining the first repository includes a first multiple of change data records that includes at least a first threshold number of change data records. The method further includes determining a second repository includes a second multiple of change data records that includes at least a second threshold number of change data records. The second repository is configured to store data records. The first threshold number and the second threshold number are equal. The method further includes retrieving, in response to: the first multiple of change data records of the first repository including at least the first threshold number of change data records and the second repository including the second multiple of change data records including at least the second threshold number of change data records, the second multiple of change data records of the second repository. The method further includes generating multiple change files. Each change file includes at least one change data record of the second multiple of change data records. The archive repository is configured to store data files. The method further includes storing the multiple change files in the archive repository.

The method further includes modifying a second data record and generating a second change data record based on the modification of the second data record. The second change data record includes a user identifier associated with the modification of the second data record and a time associated with the modification of the second data record. The second change data record identifies the second data record. The method further includes storing the second change data record in the second repository.

In some embodiments, the method further includes selecting a repository status and storing the first change data record in a first repository based on the repository status.

In some embodiments, the method further includes selecting and modifying a repository status and storing the second change data record in the second repository based on the modified repository status.

In some embodiments, the method further includes selecting an archive index file from a third repository. In some embodiments, the third repository includes the repository status. In some embodiments, the method further includes modifying the archive index file based on the multiple change data files and storing the modified archive index file in the third repository.

In some embodiments, the archive index file is modified to identify the at least one change data record in each change data file.

In some embodiments, the first threshold number and the second threshold number are each inclusively between 20 million and 30 million.

In some embodiments, each change file includes only change data records associated with a specific period of time. In some embodiments, the specific period of time is at least one of: a day, a week, or a month.

In some embodiments, the specific period of time is a day. In some embodiments, the multiple change files includes a first change file associated with a first day and a second change file associated with a second day. The first change file includes at least one data record associated with the first day. The second change file includes at least one data record associated with the second day.

Another embodiment relates to content management system including a first repository configured to store data records, a second repository configured to store data records, an archive repository configured to store data files, and a content management server. The content management system is configured to modify a first data record; generate a first change data record based on the modification of the first data record; select a repository status; store the first change data record in the first repository based on the repository status; determine the first repository includes a first multiple of change data records that includes at least a first threshold number of change data records; and determine the second repository includes a second multiple of change data records that includes at least a second threshold number of change data records. The first threshold number and the second threshold number are each inclusively between 20 million and 30 million. The content management server is further configured to retrieve, in response to: the first multiple of change data records of the first repository including at least the first threshold number of change data records and the second repository including the second multiple of change data records including at least the second threshold number of change data records, the second multiple of change data records of the second repository; and generate multiple change files. Each change file includes at least one change data record of the second multiple of change data records. Each file includes only change data records associated with a specific day. The content management server is further configured to store the plurality of change files in the archive repository; delete, in response to storing the multiple change files in the archive repository, the second multiple of change data records from the second repository; select the repository status; modify the repository status; modify a second data record; generate a second change data record based on the modification of the second data record; and store the second change data record in the second repository based on the repository status.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIGS. 11A-11B are illustrations of a user interface displayed by the enterprise content management architecture of FIG. 1 to generate a request for a specific change data records.

FIG. 12 is an illustration of a user interface displayed by the enterprise content management architecture of FIG. 1 to generate a request for customer change data records.

DETAILED DESCRIPTION

Figure 1:
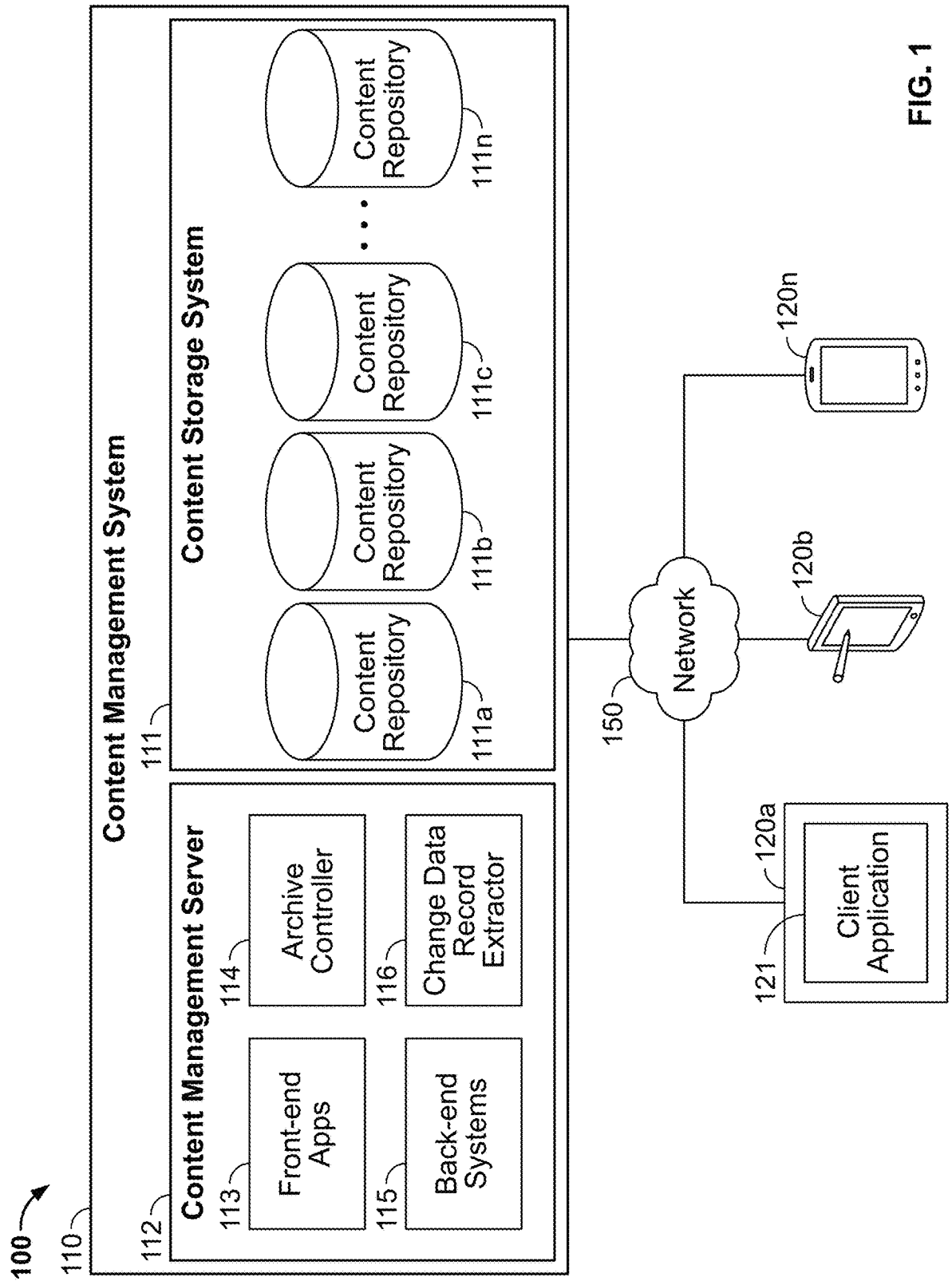
FIG. 1 illustrates an example high level block diagram of an enterprise content management architecture, according to an example embodiment.

Referring generally to the figures, systems and methods for a database archive are disclosed. The systems and methods described herein provide an improved database archive system that utilizes an A/B architecture including a first repository configured to store data records, a second repository configured to store data records, and an archive repository configured to store data files. In operation, the first repository and the second repository may receive change data records (also referred to as audit data records)

one at a time. When, the first repository reaches a threshold value (e.g., 25 million data records), the system may start filling the second repository. When the second repository reaches a threshold value (e.g., 25 million data records), the system may package the data records of the first repository into files and store the files in the archive repository. The system may then begin filling the first repository with data records.

By utilizing an A/B repository architecture, where one repository (e.g., the first repository or the second repository) always have data records therein, and the data records are only archived in response to both repositories being full, the present systems provide for a technical improvement over typical data management systems. For instance, by leaving at least some of the data records in the first repository or the second repository (and not entirely emptying both), the present systems and methods always have data records in the fast processing and retrieval repositories, and do not entirely archive every single data record during the archival process. Accordingly, the archival process is faster, requires less processing power, and the present systems and methods provide for faster data retrieval from the system overall.

Moreover, the range of 20-30 million data records provides a specific range in which the data records can be moved (i.e., added to files and then deleted from the specific repository) from the respective repository with little to no downtime in the processing of change data records. For instance, by allowing the repository (e.g., the first repository) to have up to a maximum of 20-30 million data records before the data records are moved and stored in the archive repository, the end-users notice little to-any downtime in the system, and the content system does not become overwhelmed with additional change data records which were generated while the change data records were being archived. For instance, if the threshold value were too large (e.g., 1 billion data records), the process of archiving the change data records would take a lot of processing power and memory, thereby disrupting the other functions of the system (e.g., modifying data records, etc.). Likewise, if the threshold value were too little (e.g., 500,000 data records, the system would constantly be archiving the data records, and would store few change data records in the first repository and the second repository. In that regard, the range of inclusively between 20-30 million data records provides a technical improvement to archive database systems, by providing for a large value that only activates in response to large volumes of data records, but provides a responsive system that does not become overloaded by the archiving process.

Moreover, databases are typically backed-up on a regular basis (e.g., nightly, weekly, etc.), and these fast retrieval databases (e.g., the first and second repositories) are generally slow at being backed up, because they include hierarchical/relational structures between the data that need to be captured during the back-up process. In comparison, the archive repository is a flat storage structure that is fast at copying and large data transport (as compared to querying). Accordingly, by archiving the data records at a specific volume (between 20 and 30 million data records), the present systems and methods provide for faster more efficient data back-up that can be performed in a single night and does not jeopardize the chance of specific data being missed or not backed-up. In this regard, the present systems and methods provide for a more secure and consistent type of storage where recent data records are stored in fast querying storage (e.g., relational database), but the vast majority of data records are stored in a flat data structure that is quicker and easier to back-up and store for a long period of time.

Additionally, the present systems may create, maintain, and modify an index archive file which provides an index into the change files of the archive repository. By creating, modifying, and maintaining the archive index file, the present systems provide faster retrieval, indexing, and better performance during data retrieval. For instance, the first and second repositories are fast at data retrieval because they are typically configured to store data records, whereas the archive repository is generally slow at data retrieval because it is structured store data files, and the data files need to be parsed to find each corresponding data record. However, the present systems and methods negate this slow retrieval process by creating, modifying, and maintaining the archive index file because the archive index file provides an index to the specific change file(s) in which the requested data records are stored. In that regard, the present systems and methods provide improvements to archive databases and repositories by utilizing the archive index file, which provides for faster querying, less burdensome archive storage, and little to delays in retrieving archived change data records.

Referring now to FIG. 1 an enterprise content management system 100 is shown, according to an example embodiment. The enterprise may be a business, an organization, or the like. As shown, the system 100 may include a content management system 110, and a plurality of client computing devices 120a, 120b, . . . 120n, coupled to each other via a network 150. The content management system 110 may include a content storage system 111 and a content management server 112. The content storage system 111 may have two or more content repositories, e.g., 111a, 111b, 111c . . . and 111n.

The network 150 communicably and operably couples the content management system 110 and the client computing devices 120a-120n such that communicable and operable computing may be provided between the content management system 110 and the client computing devices 120a-120n over the network 150. In various embodiments, the network 150 includes any combination of a local area network (LAN), an intranet, the Internet, or any other suitable communications network, directly or through another interface.

The client computing devices 120a-120n may be any machine or system that is used by a user to access the content management system 110 via the network 150, and may be any commercially available computing devices including laptop computers, desktop computers, mobile phones, smart phones, tablet computers, netbooks, and personal digital assistants (PDAs). A client application 121 may run from a client computing device, e.g., 120a, and access content in the content management system 110 via the network 150. In some embodiments each client computing device 120a-120n may include a network interface (not shown to communicate with the network) and a processing circuit (not shown) to process data (e.g., data records, change data records) and/or generate requests. The client computing devices 120a-120n are illustrated in more detail in FIG. 4.

The content storage system 111 may store content that client applications (e.g., 121) in client computing devices 120a-120n may access and may be any commercially available storage devices. Each content repository (e.g., 111a, 111b, 111c or 111n) may store content, including data records, change data records, an archive index file, and the like. Data records may be stored in the content repositories 111a-111n, but each tenant's data may be segregated from other tenants' data in the content storage system 111 by being stored in a separate content repository. In some embodiments, each content repository 111a-111n may include multiple additional repositories (see FIG. 6). In this regard, each content repository 111a-111n may be a group or set of repositories associated with a specific customer or tenant.

The content management server 112 is typically a remote computer system accessible over a remote or local network, such as the network 150. The content management server 112 could be any commercially available computing devices. A client application (e.g., 121) process may be active on one or more client computing devices 120a-120n. The corresponding server process may be active on the content management server 112, as one of the front-end applications 113 described with reference to FIG. 2. The client application process and the corresponding server process may communicate with each other over the network 150, thus providing distributed functionality and allowing multiple client applications to take advantage of the information-gathering capabilities of the content management system 110.

In some embodiments, the content management server 112 may include an archive controller 114 which may monitor the change repositories (as described with reference to FIG. 6) and determine when the change repositories (e.g., a first change repository 604 and a second change repository 608) have reached a threshold number of data records. Then, in response to the change repository (e.g., 604 or 608) reaching the threshold number of data records, the archive controller 114 may generate an archive file including the change data records of one of the change repositories 604 or 608, store the archive file in an archive repository 612, empty the corresponding change repository, modify an archive index file based on the change data records, and then modify a repository status to switch change repositories in use, as will be discussed further with regard to the methods 700-1000.

Additionally, the content management server 112 may include a change data record extractor 116, which may retrieve change data records from the first change repository 604, the second change repository 608, and the archive repository 612 and combine the change data records. The change data extractor 116 may then output the combined change data records, as will be described further with regard to the methods 700-1000.

Although the front-end applications 113, the back-end systems 115, the archive controller 114, and the change data extractor 116, are shown in one server, it should be understood that they may be implemented in multiple computing devices (e.g., multiple servers for each, a single server for the for each front-end application 113, a single server for each back-end system 115, a server for the archive controller 114, etc.).

In one implementation, the content management system 110 may be a multi-tenant system where various elements of hardware and software may be shared by one or more customers. For instance, a server may simultaneously process requests from a plurality of customers, and the content storage system 111 may store content for a plurality of customers. In a multi-tenant system, a user is typically associated with a particular customer. In one example, a user could be an employee of one of a number of pharmaceutical companies which are tenants, or customers, of the content management system 110.

In one embodiment, the content management system 110 may run on a cloud computing platform. Users can access content on the cloud independently by using a virtual machine image, or purchasing access to a service maintained by a cloud database provider.

In one embodiment, the content management system 110 may be provided as Software as a Service ("SaaS") to allow users to access the content management system 110 with a thin client.

Figure 2:
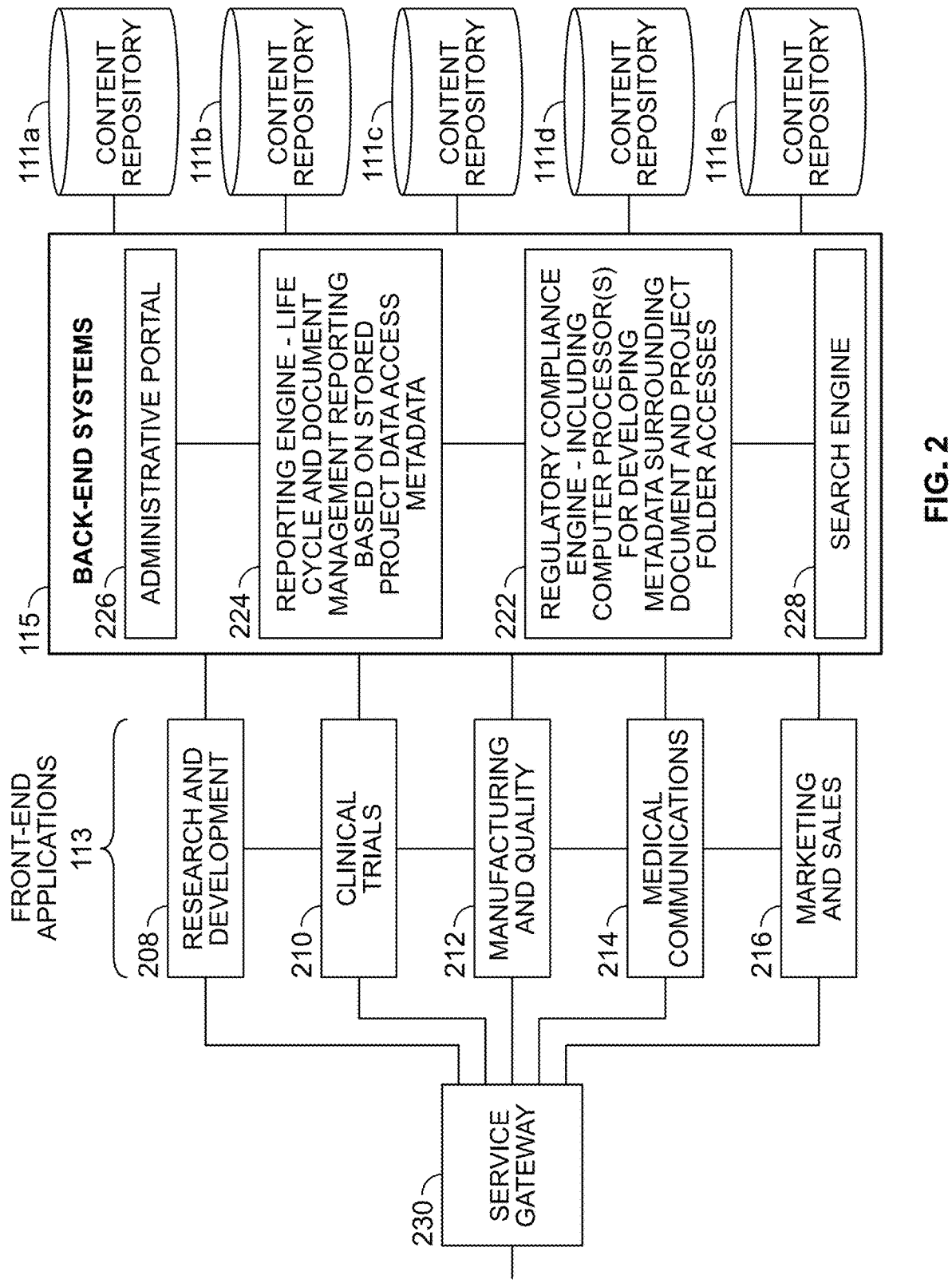
FIG. 2 provides a description of the content management system with additional specific applications and interfaces connected thereto, according to an example embodiment.

FIG. 2 provides a description of the content storage system 111 with additional specific applications and interfaces connected thereto, according to an example embodiment. In an embodiment, this content storage system 111 is a cloud-based or distributed network-based system for consolidating an enterprise's data, oftentimes integrating multiple content repositories in an enterprise into a single system having coordinated control, measuring, and auditing of data creation, access and distribution.

In an embodiment of the content storage system 111 for the life sciences industry, as illustrated in the figure, this content storage system 111 can include specific data collections for the following areas and/or business process-specific front-end applications 113:

The Research & Development (R&D) front-end application 208 provides for an aggregation of materials in support of research and initial clinical trial submissions through building organized and controlled content repositories within the content management system 110, more specifically, the content repository 111a. Elements that can be stored, organized, and managed through this front-end include submission bills of materials, Drug Information Association (DIA) reference models support, and submission-ready renderings. This front-end 208 is designed to provide an interface to the content management system 110 whereby researchers, contract research organizations (CROs), and other collaboration partners can access and/or distribute content through a single controlled document system.

The clinical trials front-end application 210 provides for faster and more organized access to trial documents and reports, while supporting seamless collaboration between sponsors, CROs, sites, investigators and other trial participants. Specific features both ease study and site administration as well as support the DIA trial master file (TMF) reference model. Having this front-end application providing access to the content management system 110 further provides for efficient passing off of content, e.g., in the content repository 111b, between this phase and other phases of the life sciences development process.

The manufacturing and quality application 212 enables the creation, review, approval and distribution of controlled documents across the organization and with external partners in the context of materials control and other manufacturing elements. The application 212 provides functionality in support of the manufacturing process including watermarking, controlled print, signature manifestation and "Read and Understood" signature capabilities. The documents and metadata associated with this process is managed and stored in the content management system 110, or more specifically, the content repository 111c, whereby it can be assured that the related documents are not distributed in contravention of law and company policy.

The medical communications application 214 provides for communications with medical facilities, including call center access, integration, and interface functionality. Particular access control features and metadata associated with this application 214 include expiration and periodic review elements, multi-channel support, global documents and automatic response package generation through the content management system 110. Related documents may be stored in the content repository 111d.

The marketing and sales application 216 provides an end-to-end solution for the development, approval, distribution, expiration and withdrawal of promotional materials. Specific features include support for global pieces, approved Form FDA 2253 (or similar international forms) form generation, online document, and video annotation, and a built-in digital asset library (DAL). Again, the communications may be through the content management system 110, and the promotional materials may be stored in the content repository 111e.

In some embodiments, there are provided a number of back-end system applications 115 that provide for the management of the data, forms, and other communications in the content management system 110. For example, the back-end systems applications 115 may include a regulatory compliance engine 222 to facilitate regulatory compliance, including audit trail systems, electronic signatures systems, and system traceability to comply with government regulations, such as 21 CFR Part 11, Annex 11 and GxP-related requirements. The regulatory compliance engine 222 may include processors for developing metadata surrounding document and project folder accesses so from a regulatory compliance standpoint it can be assured that only allowed accesses have been permitted. The regulatory compliance engine 222 may further includes prevalidation functionality to build controlled content in support of installation qualification (IQ) and/or operational qualification (OQ), resulting in significant savings to customers for their system validation costs.

In some embodiments, the back-end systems 115 may contain a reporting engine 224 that reports on documents, their properties and the complete audit trail of changes. These simple-to-navigate reports show end users and management how content moves through its life cycle over time, enabling the ability to track 'plan versus actual' and identify process bottlenecks. The reporting engine may include processors for developing and reporting life cycle and document management reporting based on stored project data and access metadata relative to documents, forms and other communications stored in the content management system 110.

In some embodiments, the back-end systems 115 can include an administrative portal 226 whereby administrators can control documents, properties, users, security, workflow and reporting with a simple, point-and-click web interface. Customers also have the ability to quickly change and extend the applications or create brand new applications, including without writing additional software code.

In some embodiments, the back-end systems 115 may include a search engine 228 whereby the content management system 110 can deliver simple, relevant and secure searching.

In some embodiments, the content management system 110 may include more back-end systems.

In providing this holistic combination of front-end applications 113 and back-end systems 115, the various applications can further be coordinated and communicated with by the service gateway 230, which in turn can provide for communications with various web servers and/or web services APIs. Such web servers and/or web services APIs can include access to the content and metadata layers of some or all of the various front-end applications 113 and back-end systems 115, enabling seamless integration among complementary systems.

In the context of the described embodiments, content in one repository, e.g., the content repository 111a for the Research & Development (R&D) front-end application 208, may be re-used in another repository (e.g., the content repository 111d) with another front-end application (e.g., the medical communications application 214).

In some embodiments, the content management system 110 may store content for other industries.

Figure 3:
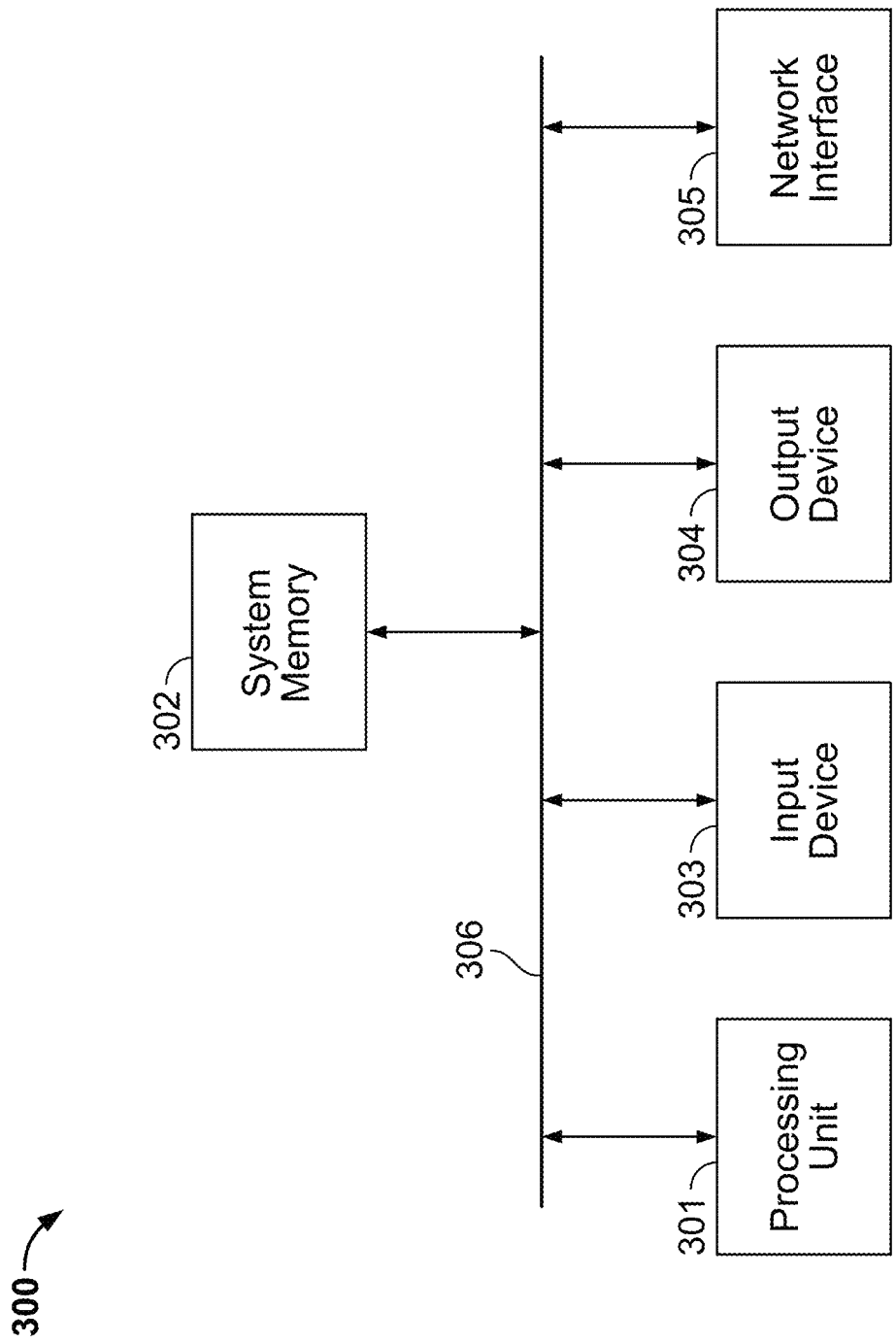
FIG. 3 illustrates an example block diagram of a computing device, according to an example embodiment.

FIG. 3 illustrates an example block diagram of a computing device 300 which can be used as the client computing devices 120a-120n, and the content management server 112 in FIG. 1, according to an example embodiment. The computing device 300 is only one example of a suitable computing environment and is not intended to suggest any limitation as to scope of use or functionality. The computing device 300 may include a processing unit 301, a system memory 302, an input device 303, an output device 304, a network interface 305 and a system bus 306 that couples these components to each other.

The processing unit 301 may be configured to execute computer instructions that are stored in a computer-readable medium, for example, the system memory 302. In some embodiments, the processing unit 301 may be implemented as a general-purpose processor, an application specific integrated circuit (ASIC), one or more field programmable gate array (FPGAs), a digital signal processor (DSP), a group of processing components or other suitable electronic processing components.

The system memory 302 typically includes a variety of computer readable media which may be any available media accessible by the processing unit 301. For instance, the system memory 302 may include one or more memory devices (e.g., RAM, NVRAM, ROM, flash memory, hard disk storage, etc.) that store data and/or computer code for facilitating the various processes described herein. That is, in operation and use, the system memory 302 stores at least portions of instructions and data for execution by the processing unit 301. The system memory 302 may be or include tangible, non-transient volatile memory and/or non-volatile memory.

A user can enter commands and information to the computing device 300 through the input device 303. The input device 303 may be, e.g., a keyboard, a touchscreen input device, a touch pad, a mouse, an RFID scanner, a sensor, a microphone, and/or a pen.

The computing device 300 may provide its output via the output device 304 which may be, e.g., a monitor or other type of display device, an RFID scanner, a sensor, a speaker, or a printer.

The computing device 300, through the network interface 305, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 305 may include program logic and/or hardware-based components that connect the computing device 300 to the network 150. For example, the network interface 305 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 305 includes the hardware and machine-readable media configured to support communication over multiple channels of data communication (e.g., wireless, Bluetooth, near-field communication (NFC). In some embodiments, the network interface 305 includes cryptography logic and capabilities to establish a secure communications session.

Figure 4:
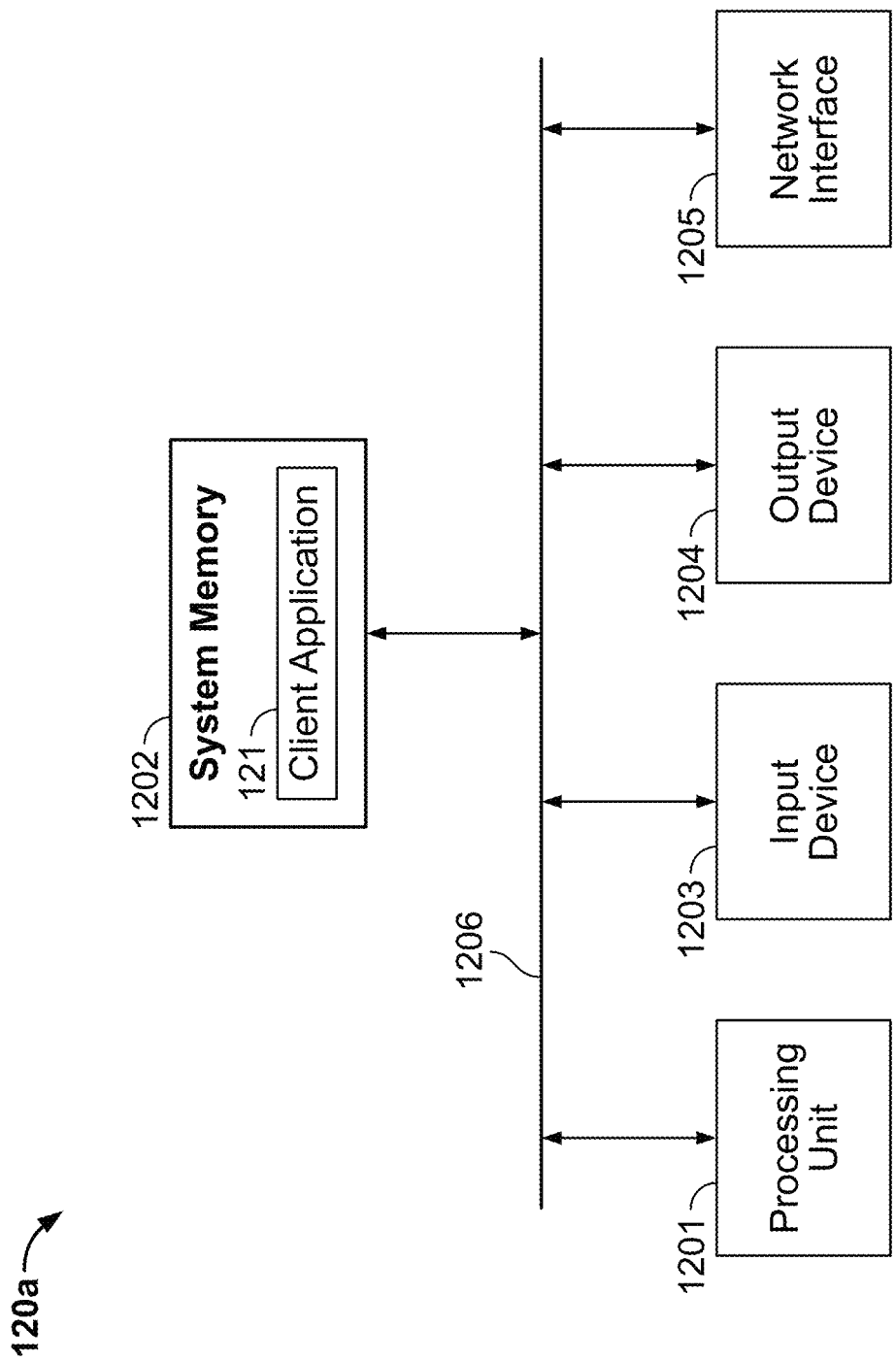
FIG. 4 illustrates an example high level block diagram of a client computing device, according to an example embodiment.

FIG. 4 illustrates an example high level block diagram of a client computing device (e.g., 120*a*) according to an example embodiment. The client computing device 120*a* may be implemented by the computing device 300 described above, and may have a processing unit 1201, a system memory 1202, an input device 1203, an output device 1204, and a network interface 1205, coupled to each other via a system bus 1206. The system memory 1202 may store the client application 121.

Figure 5:
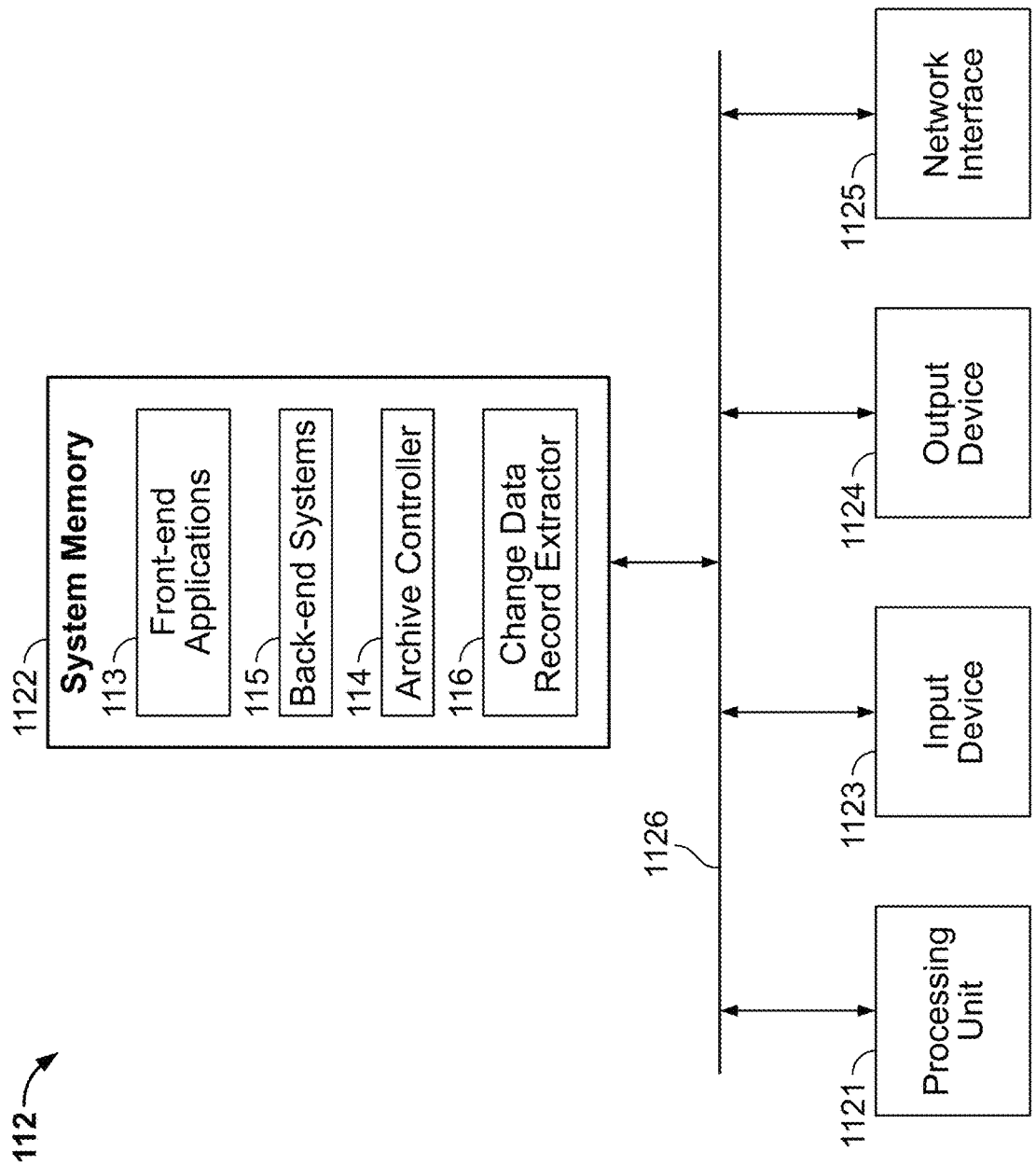
FIG. 5 illustrates an example high level block diagram of the content management server, according to an example embodiment.

FIG. 5 illustrates an example high level block diagram of the content management server 112 according to an example embodiment. The content management server 112 may be implemented by the computing device 300, and may have a processing unit 1121, a system memory 1122, an input device 1123, an output device 1124, and a network interface 1125, coupled to each other via a system bus 1126. The system memory 1122 may store the front-end applications 113, the back-end systems 115, the archive controller 114, and the change data extractor 116.

Figure 6:
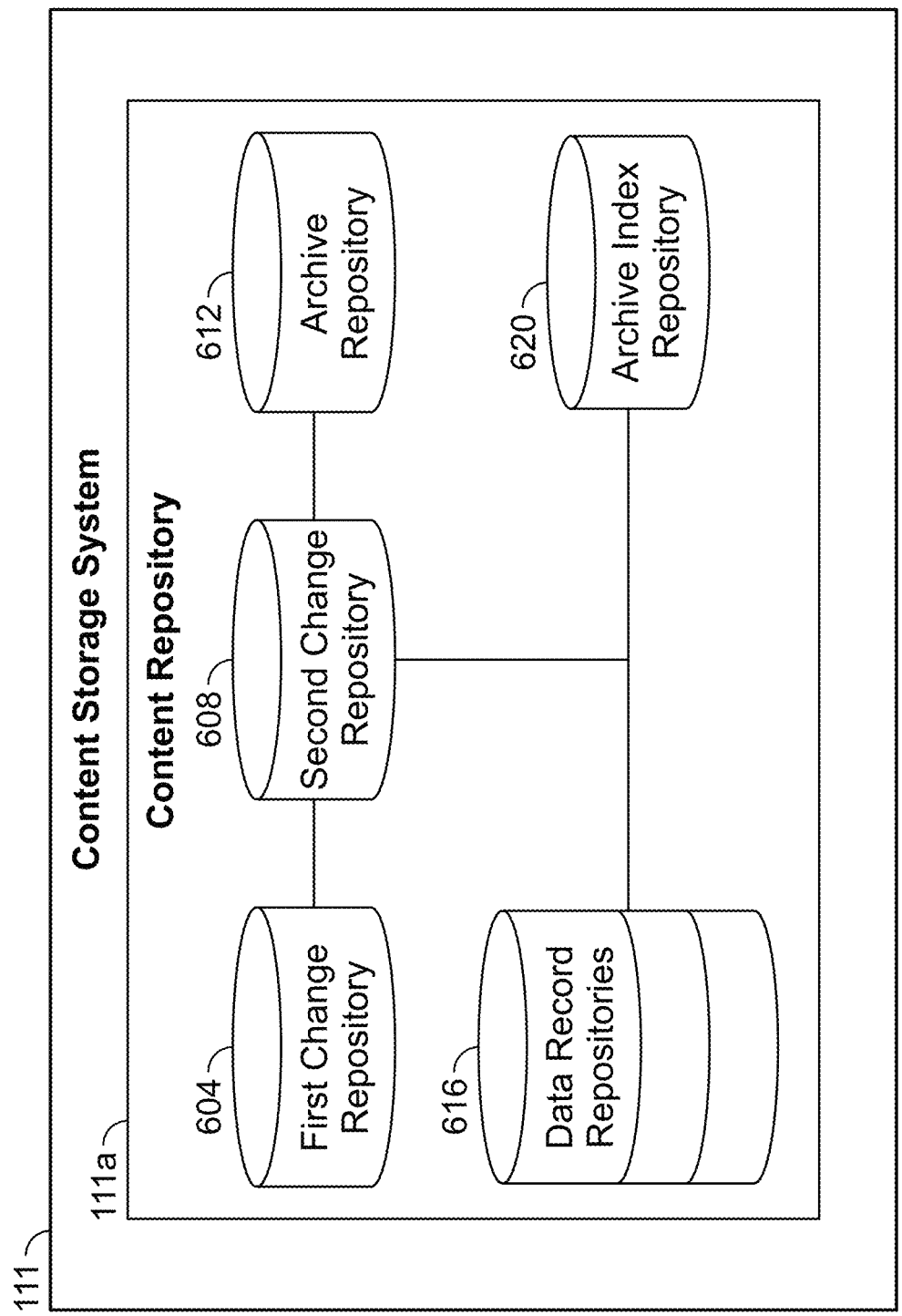
FIG. 6 illustrates an example high level block diagram of a content storage system, according to an example embodiment.

FIG. 6 illustrates an example high level block diagram of the content storage system 111, according to an example embodiment. The content storage system 111 may include multiple content repositories or sets of content repositories 111*a-n*. Likewise, each content repositories or set of content repositories (e.g., 111*a*) may include multiple repositories such as a first change repository 604 (also referred to as a first repository), a second change repository 608 (also referred to as a second repository), an archive repository 612, one or more data record repositories 616 (also referred to as a fourth repository), and an archive index repository 620 (also referred to as a third repository).

The first change repository 604 and the second change repository 608 may be repositories (e.g., databases) that work in tandem to receive and store the change data records. Each change data record may represent a specific change or modification of a data record and include a timestamp or date/time, a user or username (i.e., a user identifier) who performed the change, a description of the change, and the data record which experienced the change. As data records are modified, the content management system 110 may generate change data records and store the change data records in the first change repository 604 and/or the second change repository 608. For instance, the content management system 110 reference and/or utilize a repository status to determine which repository (e.g., the first change repository 604 or the second change repository 608) is receiving change data records up to a specific threshold number of data records. In some embodiments, the first change repository 604 and the second change repository 608 may be structured and/or configured to store the change data records. In this regard, the first change repository 604 and the second change repository 608 may provide for faster, more efficient querying and selection of change data records than the archive repository 612.

For instance, the first change repository 604 and the second change repository 608 may be database tables including a row for each change data record. In some embodiments, the first change repository 604 and the second change repository 608 may be relational databases. In some embodiments, the first change repository 604 and the second change repository 608 can be structured according to various database types, such as, relational, hierarchical, network, flat, point-in time, and/or object relational. Further, the first change repository 604 and the second change repository 608 may include a plurality of nonvolatile/non-transitory storage media such as solid-state storage media, hard disk storage media, virtual storage media, cloud-based storage drives, storage servers, and/or the like.

The archive 612 may be repository (e.g., a database) that is structured or configured to receive, store, and manage archived change data records. In this regard, the archive repository 612 may receive, store, and manage data records that are being emptied or cleared from the first change repository 604 or the second change repository 608. For example, content management system 110 may determine the first change repository 604 and the second change repository 608 have reached a threshold number of change data records. Accordingly, based on the repository status, the content management system 110 may move the change data records from the first change repository 604 or the second change repository 608 to the archive repository 612 for storage therein. In some embodiments, the archive repository 612 may be structured and/or configured to store change data record files including multiple change data records. For instance, the content management system 110 may generate change files including the change data records being moved from the first change repository 604 or the second change repository 608, and then store the change files in the archive repository 612. In some embodiments, each change file may be associated with a specific period of time (e.g., a specific day, a specific week, a specific month, etc.). In this regard, the archive repository 612 may provide for slower querying than the first change repository 604 and the second change repository 608, but more secure storage of change data records.

In that regard, the archive repository 612 can be structured according to various database types, such as, relational, hierarchical, network, flat, point-in time, and/or object relational. In one example, the archive repository 612 may be an Amazon S3 data repository. Further, the archive repository 612 may include a plurality of nonvolatile/non-transitory storage media such as solid-state storage media, hard disk storage media, virtual storage media, cloud-based storage drives, storage servers, and/or the like. In one example, the archive repository may be a cloud object storage repository configured to store data files such as an Amazon S3® data bucket repository, a Microsoft Azure® blob storage repository, a Rackspace Cloud® file repository, and a Google Cloud® storage repository.

The data record repositories 616 may each be repository (e.g., a database) that is structured or configured to receive, store, and manage data records. For instance, the tenant associated with the specific content repository (e.g., 111*a*) may store data records in each of the data record repositories 616. In some embodiments, the tenant (e.g., via a client computing device (e.g., 120*a*) may request specific data records and make modification(s) to the data record. Then, in response, the content management system 110 may generate a change data record which captures the changes made to the data record (as well as data pertaining to the user who made the change). In some embodiments, each data record repository 616 may be structured and/or configured to store the data records.

For instance, each data record repository 616 may be database tables including a row for each change data record. In some embodiments, each data record repository 616 may be relational databases. In some embodiments, each data record repository 616 can be structured according to various database types, such as, relational, hierarchical, network, flat, point-in time, and/or object relational. Further, each data record repository 616 may include a plurality of nonvolatile/non-transitory storage media such as solid-state storage media, hard disk storage media, virtual storage media, cloud-based storage drives, storage servers, and/or the like.

The archive index or third repository 620 may be repository (e.g., a database) that is structured or configured to receive, store, and manage an archive index file. In some embodiments, the archive index file is stored in the archive repository 612. In other embodiments, the archive index file is stored in the archive index repository 620. The archive index file may be used by the content management system 110 to locate the specific file and/or location in the specific file at which change data records are stored. For instance, the archive index file may include a row for each data record with a change data record stored in the archive repository and include the specific file(s) a corresponding change data record is located in and/or a specific location in the specific file, as will be described further herein. In some embodiments, the archive index repository 620 may further store the repository status described further herein.

Accordingly, the archive index repository 620 can be structured according to various database types, such as, relational, hierarchical, network, flat, point-in-time, and/or object relational. In one example, the archive index repository 620 may be an Amazon S3 data repository. Further, the archive index repository 620 may include a plurality of nonvolatile/non-transitory storage media such as solid-state storage media, hard disk storage media, virtual storage media, cloud-based storage drives, storage servers, and/or the like.

Figure 7A:
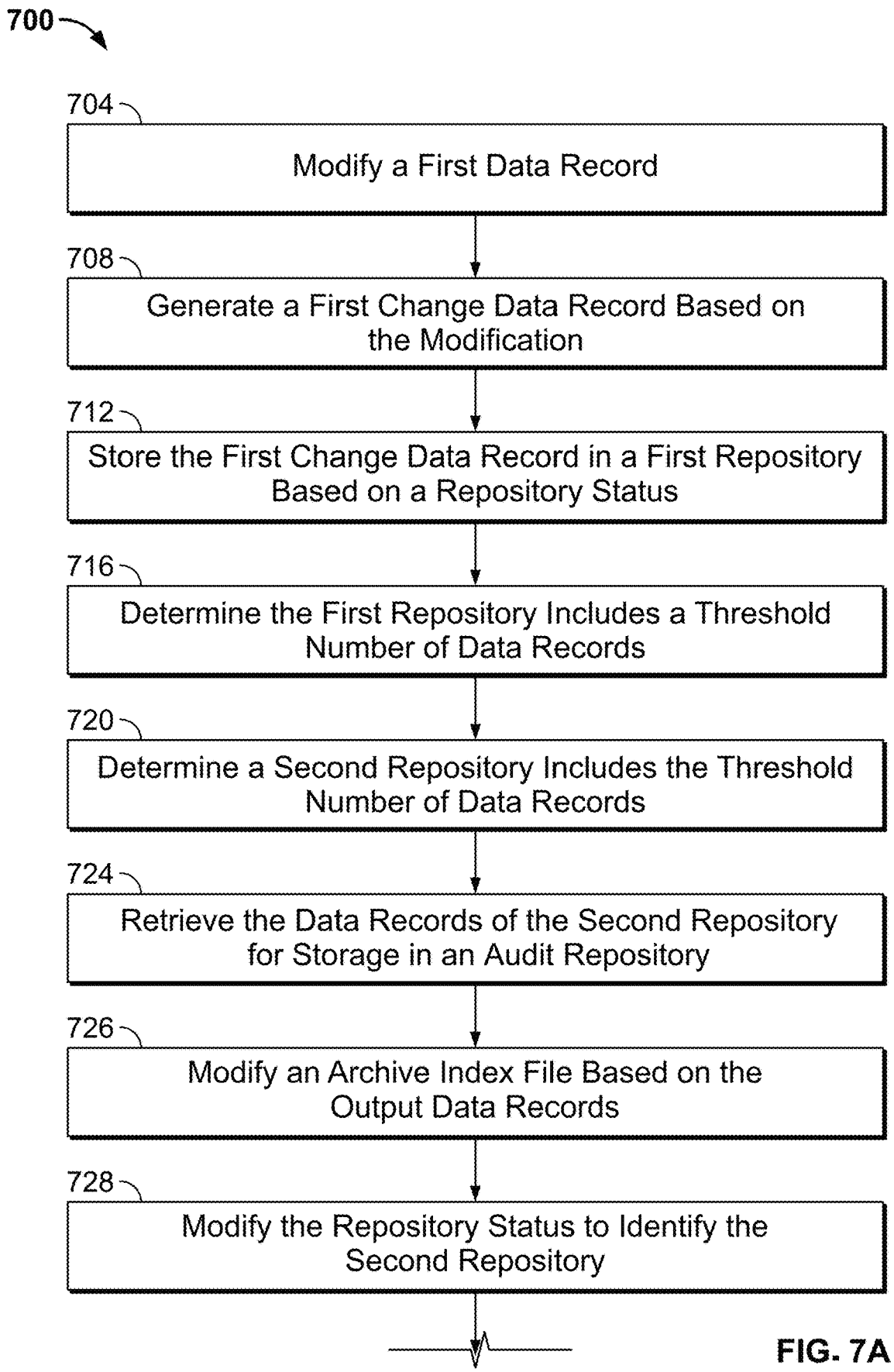
FIGS. 7A-7B are a flow diagram of a method for archiving change data records, according to an example embodiment.
Figure 7B:
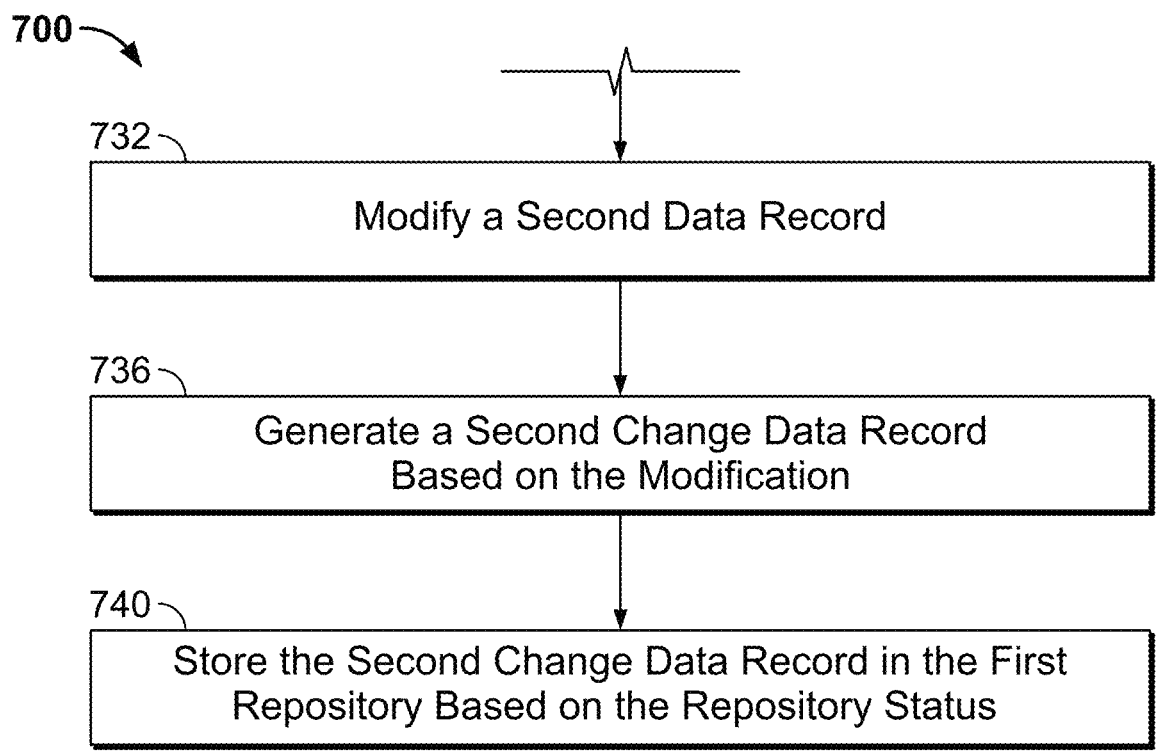

Referring now to FIGS. 7A-7B, a method 700 of archiving multiple change data records is shown, according to an example embodiment. Method 700 can be carried out by the system of FIG. 1. More particularly, the method 700 can be carried out by the content management server 112.

Method 700 commences at step 704 at which the content management server 112 modifies a first data record. For example, the content management server 112 may modify a specific field of the first data record (e.g., set a specific value to false, change a specific value, change a date, etc.). In some embodiments, the content management server 112 may modify the first data record in response to receiving a request (e.g., from one of the client computing devices 120a-n). For instance, the client computing device (e.g., 120a) may send a request to the content management server 112 to modify a specific data record, and the content management server 112 may modify the specific data record in response.

Once the content management server 112 has modified the first data record, the method 700 proceeds to step 708 at which the content management server 112 generates a first change data record based on the modification. The change data record may include a timestamp or date/time field, a user or username field (i.e., a user identifier), a description of the modification, and/or the record which experienced the modification. For instance, FIG. 11A shows an example change data record listing 1130 which shows multiple change data records.

Once the content management server 112 has generated the first change data record, the method 700 proceeds to step 712 at which the content management server 112 stores the first change data record in the first repository (e.g., the first change repository 604). In some embodiments, the content management server 112 may store the first change data record in the first repository 604 based on the repository status. For instance, the repository status may indicate that the first repository 604 is currently in-use or active, and the content management server 112 may store the first change data record in the first repository 604 based on the indication of the repository status. In this regard, at or before step 712, the content management server 112 may select and/or retrieve the repository status (e.g., from one of the first repository 604, the second repository 608, or the archive repository 612).

Once the content management server 112 has stored the first change data record in the first repository 604, the content management server 112 may determine the number of change records in the first repository 604. If the number of data records exceeds a threshold number, the method 700 may proceed to step 716 at which the content management server determines the first repository 604 includes at least the threshold number of change data records. If the number of data records does not exceed the threshold number, the method 700 may end, and the next time a data record is modified and a change data record is generated, the change data record may be stored in the first repository 604.

In some embodiments, the threshold number may be a specific number associated with the capacity of the first repository 604. For instance, the first repository 604 may be configured to store a maximum of 200 million data records, and so the threshold number may be 199 million data records (to ensure the first repository 604 does not overflow). In some embodiments, the threshold number may be (inclusively) between 20 million and 30 million data records. In some embodiments the threshold number may be 25 million data records.

The range of 20-30 million data records provides a specific range in which the data records can be moved (i.e., added to files and then deleted from the specific repository) from the respective repository with little to no downtime in the processing of change data records. For instance, by allowing the repository (e.g., the first repository 604) to have up to a maximum of 20-30 million data records before the data records are moved and stored in the archive repository 612, the end-users do not notice any downtime in the content management server 112, and the content management server 112 does not become overwhelmed with additional change data records which were generated while the change data records were being archived. For instance, if the threshold value were too large (e.g., 1 billion data records), the process of archiving the change data records would take a lot of processing power and memory, thereby disrupting the other functions of the content management server 112 (e.g., modifying data records, etc.). Likewise, if the threshold value were too little (e.g., 500,000 data records, the content management server 112 would constantly be archiving the data records, and would store few change data records in the first repository 604 and the second repository 608.

Once the content management server 112 has determined the first repository 604 includes the threshold number of change data records, the method 700 proceeds to step 720 at which the content management server 112 determines the second repository 608 includes the threshold number of change data records. If the second repository 608 does not include the threshold number of data records, the method 700 may proceed to step 728 without archiving any data records (e.g., performing steps 724 and 726). In that regard, the content management server 112 archives the data records in response to both the first repository 604 and the second repository 604 having a threshold number of change data records.

Accordingly, once the content management server 112 has determined the first repository 604 includes the threshold number of change data records and the second repository 608 includes the threshold number of change data records, the method 700 proceeds to step 724 at which the content management server 112 queries or retrieves the change data records of the second repository 608 for storage in the archive repository 612. In some embodiments, once the second repository 608 has output the change data records, the content management server 112 may remove or delete the retrieved change data records from the second repository 608.

By utilizing an A/B repository architecture, where one repository (e.g., the first repository 604 or the second repository 608) always have data records therein, and the data records are only archived in response to both repositories being full, the present systems provide for a technical improvement over typical data management systems. For instance, by leaving at least some of the data records in the first repository 604 or the second repository 608 (and not entirely emptying both), the present systems and methods always have data records in the fast processing and retrieval repositories, and do not entirely archive every single data record during the archival process. Accordingly, the archival process is faster, requires less processing power, and the present systems and methods provide for faster data retrieval, when data records are requested, as discussed with regard to the methods 800-1000.

In some embodiments, at step 724, the content management server 112 may generate one or more change files and add the output change data records to the one or more change files. For instance, the content management server 112 may query the second change repository 608 for the corresponding change data records, and the second change repository 608 may output the change data records to the content management server 112. Then, the content management server 112 may generate one or more change files and add the output change data records to the one or more change files.

In some embodiments, the content management server 112 may generate a change file for each day included in the timestamps of the output change data records. For instance, the content management server 112 may receive five change data records including a first with a timestamp of 13 Sep. 2024 xxxx, a second with a timestamp of 13 Sep. 2024 xxxx, a third with a timestamp of 13 Sep. 2024 xxxx, a fourth with a timestamp of 14 Sep. 2024 xxxx, and a fifth with a timestamp of 17 Sep. 2024. Accordingly, the content management server 112 may generate three change files, a first for the day of 13 Sep. 2024, a second for the day of 14 Sep. 2024, and a third for the day of 17 Sep. 2024. The content management server 112 may then add the first three change data records to the first change file, the fourth change data record to the second change file, and the fifth change data record to the third change file.

In some embodiments, prior to generating the change files, the content management server 112 may determine if a change file for the specific day or period of time already exists (e.g., by querying the archive repository 612). For instance, using the example above, the content management server 112 may determine if a change file already exists for the days of 13 Sep. 2024, 14 Sep. 2024, and 17 Sep. 2024. If no change file exists, the content management server 112 may generate the change file. If a change file already exists, the content management server 112 may retrieve the change file and add the corresponding change data record to the change file.

In some embodiments, the change files may be associated with other periods of time (e.g., one change file per day, one change file per week, one change file per month, etc.). In some embodiments, for large transaction volumes, the content management server 112 may only add change data records to the change files up to a specific threshold value (e.g., 12.5 million data records, 25 million data records, etc.). Then, once the threshold value is reached, the content management server 112 may generate another change file for the same period of time (e.g., for the same day of time as the first).

In some embodiments, at step 724, once the content management server 112 has generated each change file including the output change data records, the content management server 112 may add the change data files to the archive repository 612. In other embodiments, the content management server 112 may add the change data files to the archive 612 at step 726.

Accordingly, once the second repository 608 has output the change data records, the method proceeds to step 726 at which the content management server 112 selects and modifies an archive index file based on the output change data records. For instance, the content management server 112 may parse the change data records of the change files, and, add an index to the specific change file in which the change data record appears. In some embodiments, the index may identify the specific data record (e.g., see "Record" in FIG. 11A-11B and "Item" in FIG. 12) of the change data record and the specific change file in which the change data record is included. In some embodiments, the index may further include a line or row number (i.e., the offset) on which the change data record is located in the change file.

For instance, using the example of the five change data records above, the first change data record may be associated with (and include a field for) a first data record "Case Dataset 1232," the second change data record may be associated with a second data record (e.g., "Medical product x"), the third change data record may be associated with the first data record, the fourth change data record may be associated with a third data record, and the fifth change data record may be associated with the second data record. Accordingly, the content management server 112 may modify the archive index file to include three additional rows or indexes: one for the first data record identifying the first change file (because both the first change data record and the third change data record were added to the first change file), one for the second data record identifying the first change file and the third change file (because the second change data record was added to the first change file and the fifth data record was added to the third change file), and one for the third data record identifying the second change file (because the fourth change data record was added to the second change file). In this regard, each index of the archive index file may provide a simple way to determine where the change data records for specific data records are located in the archive repository 612. In some embodiments, each index may further include a line or row number (i.e., the offset) on which the change data record is located within the change file.

By creating, modifying, and maintaining the archive index file, the present systems provide for faster retrieval, indexing, and better performance during the methods 8000-100, as will be described further herein. For instance, the first and second repositories 604 and 608 are fast at data retrieval because they are typically configured to store data records, whereas the archive repository 612 is generally slow at data retrieval because it is structured store data files, and the data files need to be parsed to find each corresponding data record. However, the present systems and methods negate this slow retrieval process by creating, modifying, and maintaining the archive index file because the archive index file provides an index to the specific change file(s) in which the requested data records are stored. In that regard, the present systems and methods provide improvements to archive databases and repositories by utilizing the archive index file, which provides for faster querying, less burdensome archive storage, and little to delays in retrieving archived change data records.

In some embodiments, once the content management server 112 has modified the archive index file, the content management server 112 may add the change file and the archive index file to the archive repository 612. In other embodiments, once the content management server 112 has modified the archive index file, the content management server 112 may add the change file to the archive repository 612 and the archive index file to the archive index repository 620. In other embodiments, the content management server 112 may add the change file to the archive repository 612 at step 724 and add the archive index file to the archive repository 612 or the archive index repository 620 at step 726.

Once the content management server 112 has modified the archive index file, the method 700 proceeds to step 728 at which the content management server 112 selects and modifies the repository status. For instance, at step 728, the content management server 112 may select the repository status from the archive repository 612. In other embodiments, the repository status may be stored in and selected from one of the first repository 604 or the second repository 608. Then, the content management server 112 may modify the repository status from identifying the first repository 604 (as the active repository) to identifying the second repository 608. Then, the content management server 112 may store the repository status (e.g., in the first repository 604, the second repository 608, or the archive repository 612).

Once the content management server 112 has modified the repository status, the method 700 proceeds to step 732 at which the content management server 112 modifies a second data record. For example, the content management server 112 may modify a specific field of the second data record (e.g., set a specific value to false, change a specific value, change a date, etc.). In some embodiments, the content management server 112 may modify the second data record in response to receiving a request (e.g., from one of the client computing devices 120a-n). For instance, the client computing device (e.g., 120a) may send a request to the content management server 112 to modify a specific data record, and the content management server 112 may modify the specific data record in response. In some embodiments, the first data record and the second data record may be the same data record. For instance, the content management server 112 may modify the first data record at step 704 and then modify the first data record again at step 732.

Once the content management server 112 has modified the second data record, the method 700 proceeds to step 736 at which the content management server 112 generates a second change data record based on the modification. The change data record may include a timestamp or date/time field, a user or username field (i.e., a user identifier), a description of the modification, and/or the record which experienced the modification.

Once the content management server 112 has generated the second change data record, the method 700 proceeds to step 740 at which the content management server 112 stores the second change data record in the second repository 608. In some embodiments, the content management server 112 may store the second change data record in the second repository 608 based on the repository status. For instance, the repository status may indicate that the second repository 608 is currently in-use or active (e.g., based on the modification made at step 728), and the content management server 112 may store the second change data record in the second repository 608 based on the indication of the repository status. In this regard, at or before step 740, the content management server 112 may select and/or retrieve the repository status (e.g., from one of the first repository 604, the second repository 608, or the archive repository 612).

While the method 700 is discussed with regard to the modification of two data records, it should be understood that additional data records may be modified, and the content management server 112 may store the generated data change record in the repository indicated by the repository status, until the specific repository reaches the threshold number of data records. For instance, after the method 700, the content management server 112 may modify 12 million data records, generate 12 million change data records, and store the 12 million change data records in the second repository 608. Then, once the second repository 608 reaches the threshold number of data records, the content management server 112 may proceed through the method 700 to archive the data of the first repository 608 and begin adding data change records to the first repository 604 (e.g., output the data records of the first repository 604, modify the archive index file, modify the repository status, etc.).

Figure 8:
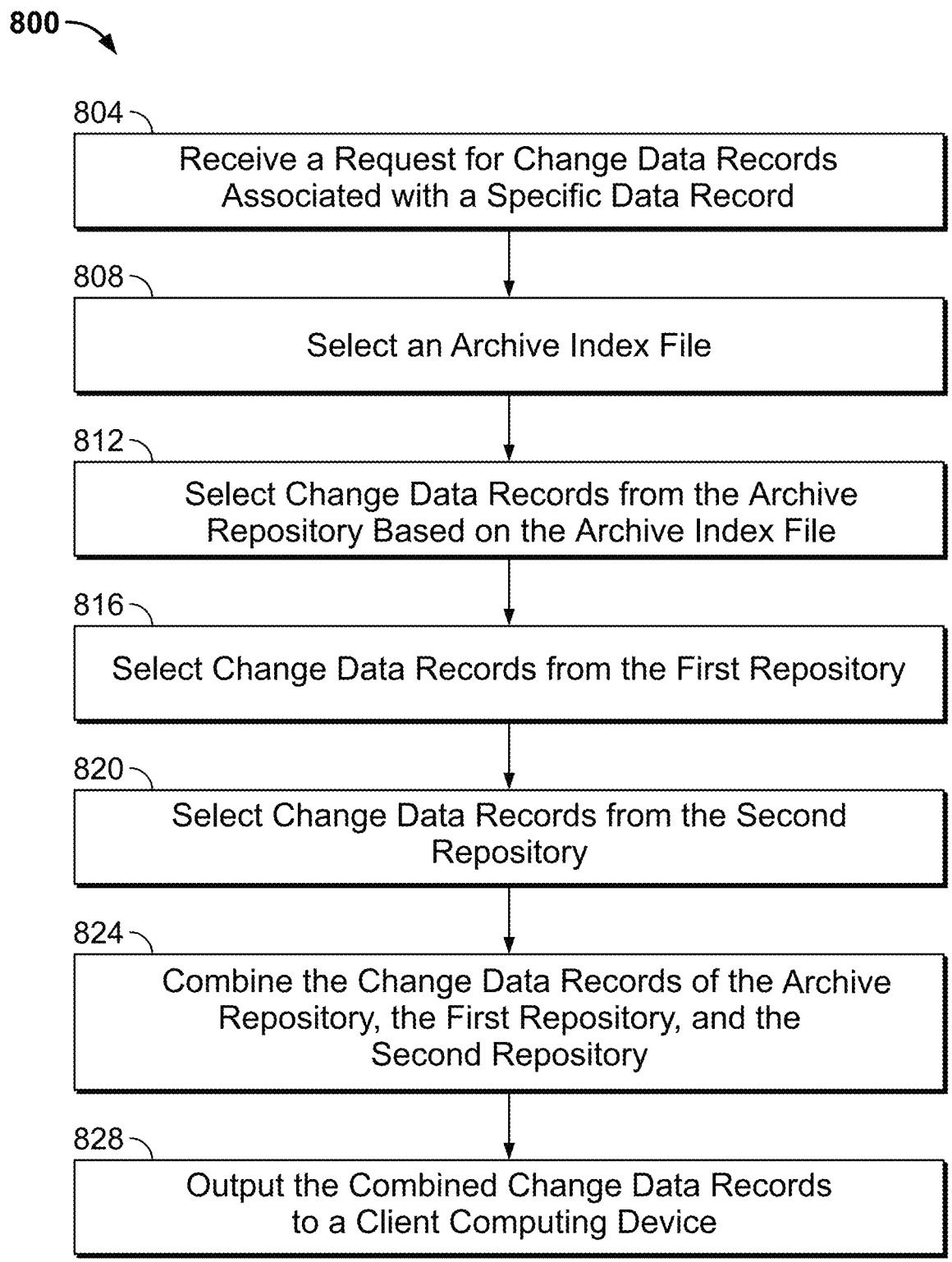
FIG. 8 is a flow diagram of a method for querying and combining change data records, according to an example embodiment.

Referring now to FIG. 8, a method 800 of querying and combining change data records is shown, according to an example embodiment. While different overall, it should be understood that any steps or discussion of the method 800 may be applied or included within the methods 700, 900, or 1000 and vice versa, and that such combinations are included within the scope of the present disclosure. For example, content management server 112 may perform the method 700 to archive change data records and then perform the method 800, 900, or 1000 to query the archived change data records.

Likewise, while the methods 700-1000 are disclosed with regard to change data records, it is within the scope of the present disclosure to use the same methodology to archive other types of data records, which may be structured differently than the change data records (e.g., Safety case data records, customer relationship management (CRM) data records, etc.). For instance, the content management server 112 may store other types of data records in the first repository 604 and the second repository 608, and then when each hits a threshold number, output the data records to be included in data record files which are added to the archive repository 612.

In one example, the content management server 112 may receive a data record which is structured according to a specific data schema (e.g., a case data schema). The content management server 112 may determine the repository status indicates the first repository (of the data record repositories 616) is active and store the data record in the first repository. Then, the content management server 112 may determine the first repository and a second repository (of the data record repositories 616) have reached a threshold value of data records. Accordingly, the content management server 112 may perform the archive process described with regard to the method 700 and store the data records of the second repository in the archive repository 612. In some embodiments, the content storage system 110 includes an archive repository for each type of data record (e.g., case data record, change data record, etc.).

Method 800 can be carried out by the system of FIG. 1. More particularly, the method 800 can be carried out by the content management server 112.

Method 800 commences at step 804 at which the content management server 112 receives a request for change data records associated with a specific data record (see FIG. 11A for an example). In some embodiments, the request may be received from one of the client computing devices (e.g., the client computing devices 120*a*-*n*). In some embodiments, the request may further include one or more filters, which are to be applied to the queried change data records.

Once the content management server 112 has received the request for change data records, the method 800 proceeds to step 808 at which the content management server 112 selects the archive index file. For instance, the content management server 112 may query the archive repository 612 or the archive index repository 620 for the archive index file, which may provide the archive index file to the content management server 112.

Once the content management server 112 has selected and/or received the archive index file, the method 800 proceeds to step 812 at which the content management server 112 queries or retrieves change data records from the archive repository 812 based on the archive index file. For instance, the content management server 112 may search or parse the archive index file for an index or row associated with the specific data record of the request. Then, in response to returning the index or row, the content management server 112 may determine each change file in which the specific data record is located. Accordingly, at step 812, the content management server 112 may select or query each of the change files (determined based on the archive index file) from the archive repository 612. The content management server 112 may then search each change file for the corresponding change data records (associated with the identified data record) and select/extract the change data records.

In some embodiment, each index or row of the archive index file may further include a line number or row associated with the specific change file. In that regard, the content management server 112 may search each change file for the corresponding change data records (associated with the identified data record) by selecting the identified row of the identified change file to extract the change data records.

In some embodiments, at or after step 812, the content management server 112 may combine the selected change data records (based on timestamp) and/or filter the selected change data records based on the filter(s) of the request. For instance, the filter may identify only change data records with the type "remove" are to be selected. Accordingly, at or after step 812, the content management server 112 may select only data records with the type "remove." In some embodiments, the content management server 112 may combine the selected change data records based on the change file from which the change data records were selected and/or the location within the change file. For instance, if the content management server 112 selects six change files, the change data records selected from the change file associated with the oldest date may be listed first followed by change data records from the change file with the second oldest date, and so on. Likewise, the change data records may be stored in the archive repository 612 based on date, such that the order of data records selected from the same change file may be maintained (e.g., a first change data record that is listed before a second change data record of the same change file will be listed before the second change data record when combining the change data records).

Once the content management server 112 has selected the change data records from the archive repository 612, the method 800 proceeds to step 816 at which the content management server 112 queries or retrieves change data records from the first repository 604. For instance, the content management server 112 may query the first repository 604 for data records associated with the specific data record of the request. In some embodiments, the query may further include the filter(s) of the request, and the first repository 604 may select and filter the change data records. Then, the first repository 604 may output the corresponding change data records to the content management server 112. In other embodiments, the first repository 604 may select and output the change data records associated with the specific data record of the request, and the content management server 112 may apply the filter(s) of the request.

Once the content management server 112 has queried or retrieved the change data records from the first repository 604, the method 800 proceeds to step 820 at which the content management server 112 queries or retrieves change data records from second repository 608. For instance, the content management server 112 may query the second repository 608 for data records associated with the specific data record of the request. In some embodiments, the query may further include the filter(s) of the request, and the second repository 608 may select and filter the change data records. Then, the second repository 608 may output the corresponding change data records to the content management server 112. In other embodiments, the second repository 608 may select and output the change data records associated with the specific data record of the request, and the content management server 112 may apply the filter(s) of the request.

Once the content management server 112 has queried the change data records from the second repository 608, the method 800 proceeds to step 824 at which the content management server 112 combines the change data records of the first repository 604, the second repository 608, and the archive repository 612. In some embodiments, the content management server 112 may combine the change data records based on the timestamp of each. For instance, the content management server 112 may combine the change data records such that a first change data record with the oldest timestamp is first, a second change data record with the second oldest timestamp is second, and so on. In other embodiments, the content management server 112 may combine the data records by listing the change data records from the archive repository 612 first (because the archive repository 612 naturally includes the oldest change data records), followed by the change data records of the inactive repository (because the inactive repository naturally incudes the older change data records of the first repository 604 and the second repository 608), followed by the change data records of the active repository. In some embodiments, the change data records are combined into a single file in which each change data record is maintained. In other embodiment, the change data records are combined into a single dataset in which each change data record is maintained.

In some embodiments, the change data records may be filtered after combining the data records at step 824 based on the filter(s) of the request. In some embodiments, one or more of the repositories may not include any corresponding change data records. Accordingly, at step 824, the content management server 112 may combine the change data records of the repositories that returned change data records.

Once the content management server 112 has combined the selected change data records, the method 800 proceeds to step 828 at which the content management server 112 (and/or the network interface 1125) output the combined change data records to one of the client computing devices 120a-120n. In some embodiments, the request may include an address (e.g., an Internet protocol (IP) address, a file transfer protocol address (FTP), an email address, etc.) to which the combined change data records are to be output too. In other embodiments, the combined change data records may be output to the client computing device (e.g., 120a) for display on a user interface (e.g., the data record audit trail page 1100).

Figure 9:
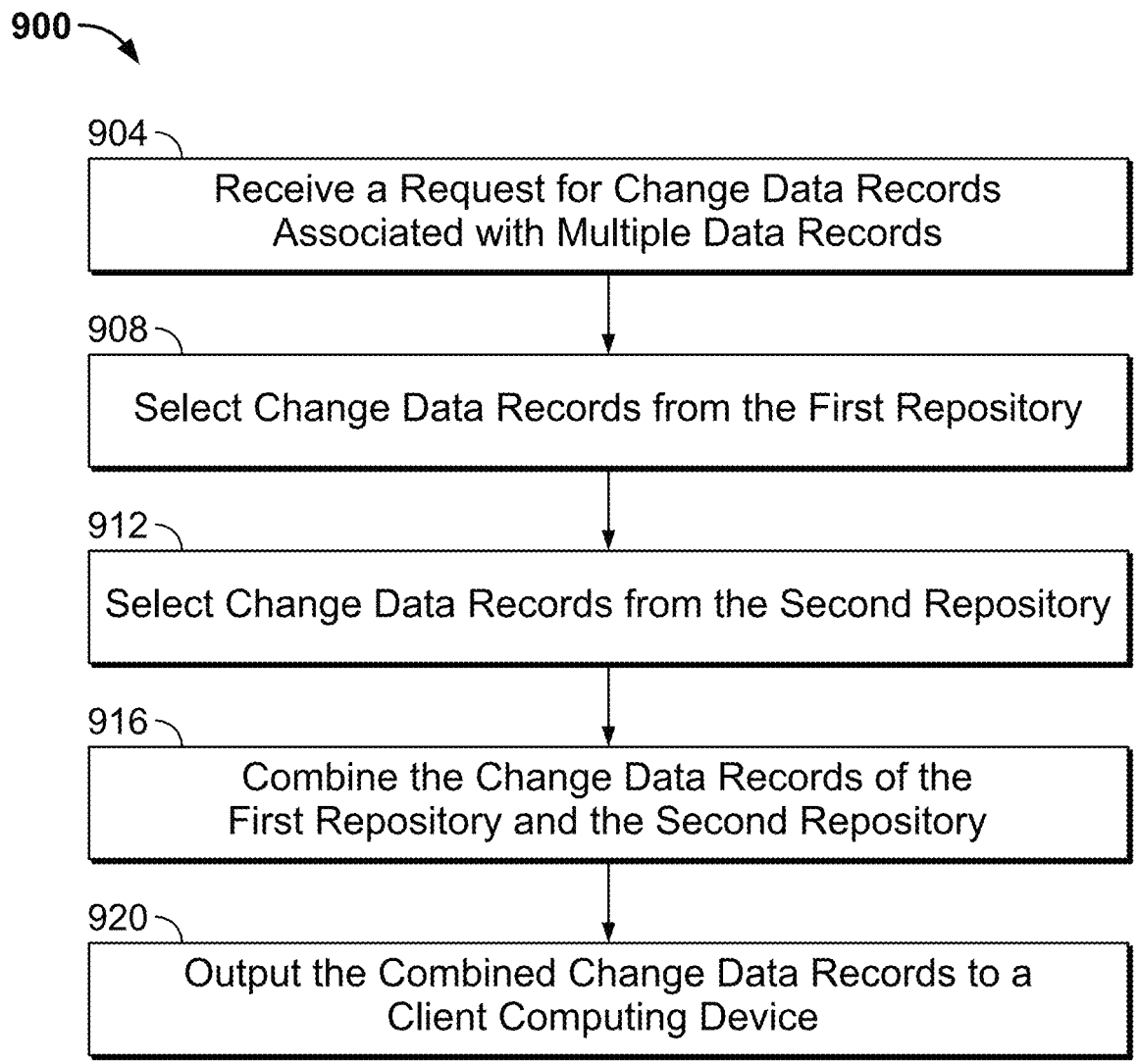
FIG. 9 is a flow diagram of a method for querying and combining change data records, according to an example embodiment.

Referring now to FIG. 9, a method 900 of querying and combining change data records is shown, according to an example embodiment. Method 900 can be carried out by the system of FIG. 1. More particularly, the method 900 can be carried out by the content management server 112. Likewise, method 900 may be similar or the same as the method 800, but provide a method for when the request identifies multiple data records.

Figure 11B:
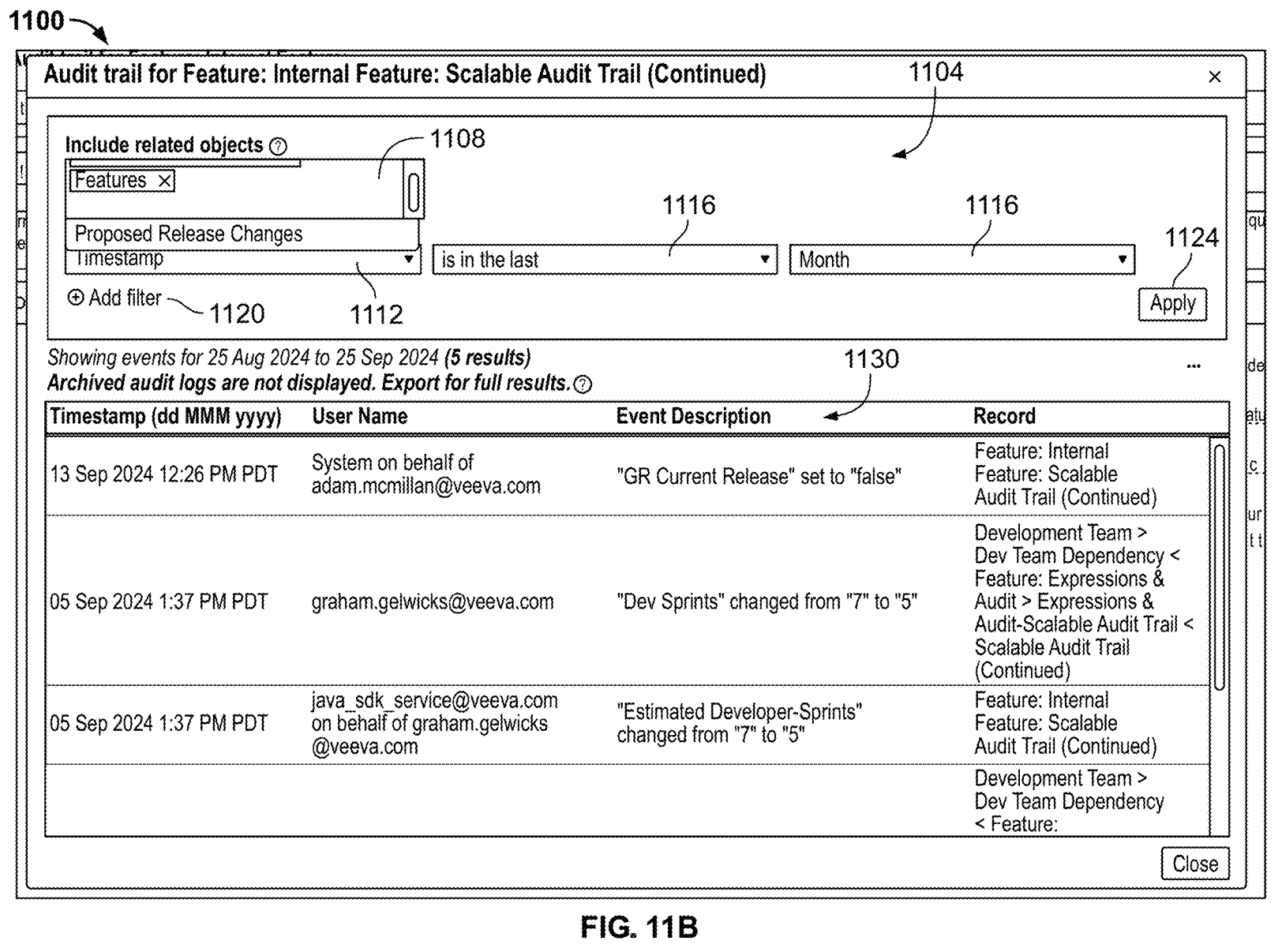

Method 900 commences at step 904 at which the content management server 112 receives a request for change data records associated with multiple specific data records (see FIG. 11B and the include related objects filter 1108 for an example). For instance, the request may include a specific data record and each child object of the specific data record, thereby including multiple data records. In some embodiments, the request may be received from one of the client computing devices (e.g., the client computing devices 120a-n). In some embodiments, the request may further include one or more filters, which are to be applied to the queried change data records. In some embodiments, at or after step 904, the content management server 112 may determine each data record identified in the request (e.g., by determining each of the child data records of the specific data record, by determining each of the parent data records of the specific data record, by determining each related data record of the specific data record, etc.).

Once the content management server 112 has received the request, the method 900 proceeds to step 908 at which the content management server 112 queries or retrieves change data records from the first repository 604. For instance, the content management server 112 may query the first repository 604 for data records associated with the specific data records of the request. In some embodiments, the query may further include the filter(s) of the request, and the first repository 604 may select and filter the change data records. Then, the first repository 604 may output the corresponding change data records to the content management server 112. In other embodiments, the first repository 604 may select and output the change data records associated with the specific data records of the request, and the content management server 112 may apply the filter(s) of the request.

Once the content management server 112 has queried the change data records from the first repository 604, the method 900 proceeds to step 912 at which the content management server 112 queries or retrieves change data records from second repository 608. For instance, the content management server 112 may query the second repository 608 for data records associated with the specific data records of the request. In some embodiments, the query may further include the filter(s) of the request, and the second repository 608 may select and filter the change data records. Then, the second repository 608 may output the corresponding change data records to the content management server 112. In other embodiments, the second repository 608 may select and output the change data records associated with the specific data records of the request, and the content management server 112 may apply the filter(s) of the request.

Once the content management server 112 has queried the change data records from the second repository 608, the method 900 proceeds to step 916 at which the content management server 112 combines the change data records of the first repository 604 and the second repository 608. In some embodiments, the content management server 112 may combine the change data records based on the timestamp of each. For instance, the content management server 112 may combine the change data records such that a first change data record with the oldest timestamp is first, a second change data record with the second oldest timestamp is second, and so on. In other embodiments, the content management server 112 may combine the data records by listing the change data records of the inactive repository (because the inactive repository naturally includes the older change data records of the first repository 604 and the second repository 608) followed by the change data records of the active repository. In some embodiments, the change data records are combined into a single file in which each change data record is maintained. In other embodiment, the change data records are combined into a single dataset in which each change data record is maintained.

In some embodiments, the change data records may be filtered after combining the data records at step 916 based on the filter(s) of the request.

Once the content management server 112 has combined the selected change data records, the method 900 proceeds to step 920 at which the content management server 112 (and/or the network interface 1125) output the combined change data records to one of the client computing devices 120a-120n. In some embodiments, the request may include an address (e.g., an Internet protocol (IP) address, a file transfer protocol address (FTP), an email address, etc.) to which the combined change data records are to be output too. In other embodiments, the combined change data records may be output to the client computing device (e.g., 120a) for display on a user interface (e.g., the data record audit trail page 1100).

Figure 10:
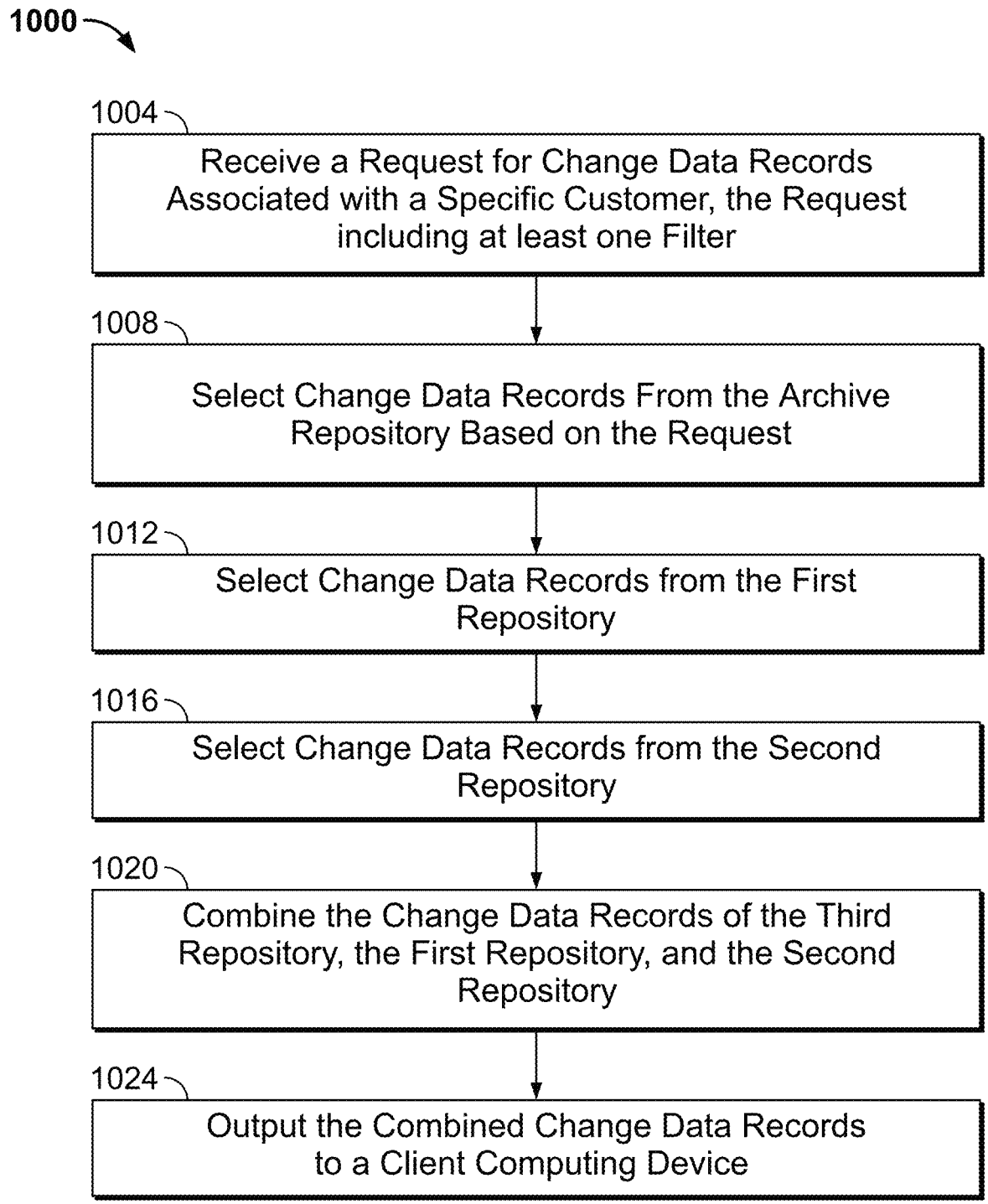
FIG. 10 is a flow diagram of a method for querying and combining change data records, according to an example embodiment.

Referring now to FIG. 10, a method 1000 of querying and combining change data records is shown, according to an example embodiment. Method 1000 can be carried out by the system of FIG. 1. More particularly, the method 1000 can be carried out by the content management server 112.

Method 1000 commences at step 1004 at which the content management server 112 receives a request for change data records associated with a specific customer or tenant. In some embodiments, the request may be received from one of the client computing devices (e.g., the client computing devices 120a-n). In some embodiments, the request may further include one or more filters (e.g., a specific date range, a specific type of change data record), which are to be applied to the queried change data records.

Once the content management server 112 has received the request for change data records, to step 1008 at which the content management server 112 queries or retrieves change data records from the archive repository 1008. For instance, the content management server 112 may determine each change file in which change data records that match the request and/or filter are located. Accordingly, at step 1008, the content management server 112 may select or query each of the change files from the archive repository 612. The content management server 112 may then search each change file for the corresponding change data records (associated with the identified data record) and extract the change data records.

In some embodiments, the content management server 112 may only select a threshold number of change data records and/or change files. For instance, the content management server 112 may only select the 100 most recent change files that match the request and then parse each file. In another example, the content management server 112 may only select the 10,000 most recent change data records which match the request. By only selecting a threshold number of change data files, the present systems and methods ensure that the content management server 112 does not become suspended during complex queries (e.g., queries that include a lot of filters or a large date range). For instance, the archive repository 612 may be configured for quick retrieval of change data records based on date (because each change file is associated with a specific date) and based on associated data record (because the index file includes an index for each specific data record). However, the archive repository 612 may be slow at retrieval of data records that correspond to a specific change type, large date patterns, and/or specific user identifier. Accordingly, by including a threshold number of change data records and/or change files, the present systems and methods may ensure the system does not become unresponsive or slow, while still providing for efficient retrieval of recent data records (due to the A/B structure of the first and second repositories 604 and 608, as previously described).

In some embodiments, at or after step 1008, the content management server 112 may combine the selected change data records (based on timestamp) and/or filter the selected change data records based on the filter(s) of the request. For instance, the filter may identify only change data records with the type "remove" are to be selected. Accordingly, at or after step 1008, the content management server 112 may select only data records with the type "remove." In some embodiments, the content management server 112 may combine the selected change data records based on the change file from which the change data records were selected and/or the location within the change file. For instance, if the content management server 112 selects six change files, the change data records selected from the change file associated with the oldest date may be listed first followed by change data records from the change file with the second oldest date, and so on. Likewise, the change data records may be stored in the archive repository 612 based on date, such that the order of data records selected from the same change file may be maintained (e.g., a first change data record that is listed before a second change data record of the same change file will be listed before the second change data record when combining the change data records). In some embodiments, the method 1000 may skip step 1008 because the filter(s) of the request identify a recent timeframe.

Once the content management server 112 has selected the change data records from the archive repository 612, the method 1000 proceeds to step 1012 at which the content management server 112 queries or retrieves change data records from the first repository 604. For instance, the content management server 112 may query the first repository 604 for data records associated with the specific data record of the request. In some embodiments, the query may further include the filter(s) of the request, and the first repository 604 may select and filter the change data records. Then, the first repository 604 may output the corresponding change data records to the content management server 112. In other embodiments, the first repository 604 may select and output the change data records associated with the specific data record of the request, and the content management server 112 may apply the filter(s) of the request.

Once the content management server 112 has queried the change data records from the first repository 604, the method 1000 proceeds to step 1016 at which the content management server 112 queries or retrieves change data records from second repository 608. For instance, the content management server 112 may query the second repository 608 for data records associated with the specific data record of the request. In some embodiments, the query may further include the filter(s) of the request, and the second repository 608 may select and filter the change data records. Then, the second repository 608 may output the corresponding change data records to the content management server 112. In other embodiments, the second repository 608 may select and output the change data records associated with the specific data record of the request, and the content management server 112 may apply the filter(s) of the request.

Once the content management server 112 has queried the change data records from the second repository 608, the method 1000 proceeds to step 1020 at which the content management server 112 combines the change data records of the first repository 604, the second repository 608, and the archive repository 612. In some embodiments, the content management server 112 may combine the change data records based on the timestamp of each. For instance, the content management server 112 may combine the change data records such that a first change data record with the oldest timestamp is first, a second change data record with the second oldest timestamp is second, and so on. In other embodiments, the content management server 112 may combine the data records by listing the change data records from the archive repository 612 first (because the archive repository 612 naturally includes the oldest change data records), followed by the change data records of the inactive repository (because the inactive repository naturally incudes the older change data records of the first repository 604 and the second repository 608), followed by the change data records of the active repository. In some embodiments, the change data records are combined into a single file in which each change data record is maintained. In other embodiment, the change data records are combined into a single dataset in which each change data record is maintained.

In some embodiments, the change data records may be filtered after combining the data records at step 1020 based on the filter(s) of the request. In some embodiments, one or more of the repositories may not include any corresponding change data records. Accordingly, at step 1020, the content management server 112 may combine the change data records of the repositories that returned change data records.

Once the content management server 112 has combined the selected change data records, the method 1000 proceeds to step 1024 at which the content management server 112 (and/or the network interface 1125) outputs the combined change data records to one of the client computing devices 120a-120n. In some embodiments, the request may include an address (e.g., an Internet protocol (IP) address, a file transfer protocol address (FTP), an email address, etc.) to which the combined change data records are to be output too. In other embodiments, the combined change data records may be output to the client computing device (e.g., 120a) for display on a user interface (e.g., the data record audit trail page 1100).

Referring now to FIGS. 11A-12, user interfaces shown and displayed to the user of the one or more client computing devices 120a-n during the methods 700, 800, 900, and/or 1000 are shown, according to example embodiments. As described herein, the user interfaces of FIGS. 11A-12 may be one or more of web interfaces generated by the content management system and rendered by each of the client computing devices 120*a-n* as part of a web application or graphical user interfaces downloaded and generated by each of the client computing devices 120*a-n* as part of a software application (e.g., a mobile application, etc.). Further, the user interfaces shown on FIGS. 11A-12 allow for communication between the user) and the content management system 110 via the respective client computing device (e.g., 120*a*) (specifically via the input and output devices (e.g., 303 and 304), respectfully). Through interaction with the various user interfaces, the user may provide user input, feedback, and other data requested by the content management system 110. In this regard, it should be understood that each interaction described herein by the user with the user interfaces of FIGS. 11*a*-12 may be provided to one or more of the client computing devices 120*a-n* and then transmitted to the content management system 110 and that each action described herein as occurring to the respective client computing device 120*a-n* (e.g., navigating to a certain page, generating a popup, etc.) may be performed by the content management system 110.

Referring now to FIGS. 11A-11B, the data record audit trail page 1100 which can be displayed on a display of one of the client computing devices 120*a-n*, is shown. In general, the data record audit trail page 1100 provides the user with an interface to review, filter, and export the change data records for a specific data record. As shown, the data record audit trail page 1100 includes a filter section 1104 and a change data record listing 1130. To render or generate the data record audit trail page 1100 on the client computing device 112, content management system 110 may provide combined change data records for the specific data record to the client computing device (e.g., 120*a*).

The filter section 1104 provides the user of the client computing device (e.g., 120*a*) an interface to set and manage one or more filters, which are to be applied to the change data records of the change data record listing 1130. For instance, the filter section 1104 includes a related objects or data record filter drop-down box 1108, a general filter drop-down box 1112, one or more filter option drop-down boxes 1116, an add filter button 1120, and an apply button 1124.

The related data record filter drop-down box 1108 may be a selectable drop-down box that, when selected, provides multiple options which correlated to specific related data records of the specific data record. For instance, in response to selecting the related data record filter drop-down box 1108, the filter section 1104 may display multiple related data records (e.g., child data records) of the specific data record, such as child or parent features and other related data records. Accordingly, the user may select the specific related data record option and then select the apply button 1124. In response, the client computing device (e.g., 120A) may generate and output a request identifying the specific data record and a filter identifying the related data record of the related data record filter drop-down box 1108.

The general filter drop-down box 1112 may be a selectable drop-down box that, when selected, provides multiple options which correlated to filters (outside of the related records) (e.g., timestamp, change/modification type, user identifier, etc.). For instance, in response to selecting the general filter drop-down box 1112, the filter section 1104 may display multiple filter types (e.g., timestamp, change/modification type (e.g., created, deleted, updated, etc.)). Accordingly, the user may select the specific filter they want to apply. Then, the user may select the values they want to set in the filter options drop down box 1116 (e.g., last month, last year, user identifier is johnsmith@veeva.com, etc.) and then select the apply button 1124. In response, the client computing device (e.g., 120A) may generate and output a request identifying the filter type and the values of the filter.

The add filter button 1120 may be a selectable button to add an additional filter to the request. In this regard, filters may be stacked or added together (e.g., related data record xyz and timestamp is between Apr. 1 and Apr. 30, 2025).

The change data record listing 1130 includes the change data records returned in response to sending the request to the content management system 110. For instance, the content management system 110 may receive a request for change data records from a specific client computing device (e.g., 120*a*), and retrieve the corresponding change data records (as discussed with regard to the methods 800-1000). Then, the content management system 110 may provide the change data records to the specific client computing device (e.g., 120*a*), and they may be displayed in the change data record listing 1130. In this regard, each line of the change data record listing 1130 may correspond to a specific change data record, and each column may correspond to a specific field of the change data record.

Referring now to FIG. 12, the client audit trail page 1200 which can be displayed on a display of one of the client computing devices 120*a-n*, is shown. In general, the client audit trail page 1200 provides the user with an interface to review, filter, and export the change data records for the specific customer or tenant. As shown, the client audit trail page 1200 includes a filter section 1204 and a change data record listing 1230. To render or generate the client audit trail page 1200 on the client computing device 112, content management system 110 may provide combined change data records for the specific customer to the client computing device (e.g., 120*a*).

The filter section 1204 provides the user of the client computing device (e.g., 120*a*) an interface to set and manage one or more filters, which are to be applied to the change data records of the change data record listing 1230. For instance, the filter section 1204 includes a general filter drop-down box 1208, one or more filter option drop-down boxes/fields 1208, an add filter button 1216, and an apply button 1220.

The general filter drop-down box 1208 may be a selectable drop-down box that, when selected, provides multiple options which correlated to filters (outside of the related records) (e.g., timestamp, change/modification type, user identifier, etc.). For instance, in response to selecting the general filter drop-down box 1208, the filter section 1204 may display multiple filter types (e.g., timestamp, change/modification type (e.g., created, deleted, updated, etc.)). Accordingly, the user may select the specific filter they want to apply. Then, the user may select the values they want to set in the filter options drop down box 1212 (e.g., last month, last year, user identifier is johnsmith@veeva.com, etc.) and then select the apply button 1220. In response, the client computing device (e.g., 120A) may generate and output a request identifying the filter type and the values of the filter.

The add filter button 1216 may be a selectable button to add an additional filter to the request. In this regard, filters may be stacked or added together (e.g., related data record xyz and timestamp is between Apr. 1 and Apr. 30, 2025).

The change data record listing 1230 includes the change data records returned in response to sending the request to the content management system 110. For instance, the content management system 110 may receive a request for change data records from a specific client computing device (e.g., 120*a*), and retrieve the corresponding change data records (as discussed with regard to the methods 800-1000). Then, the content management system 110 may provide the change data records to the specific client computing device (e.g., 120a), and they may be displayed in the change data record listing 1230. In this regard, each line of the change data record listing 1230 may correspond to a specific change data record, and each column may correspond to a specific field of the change data record.

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit," "controller," "extractor," or "application(s)"/"app(s)" may include hardware configured to execute the functions described herein. In some embodiments, each respective "circuit," "controller," "extractor," or "application(s)"/"app(s)" may include machine-readable media for configuring the hardware to execute the functions described herein. The "circuit," "controller," "extractor," or "application(s)"/"app(s)" may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit," "controller," "extractor," or "application(s)"/"app(s)" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit," "controller," "extractor," or "application(s)"/"app(s)" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components configured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general-purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks, optical disks, etc. Combinations of the above are also included within the scope of machine-readable media. In this regard, machine-executable instructions comprise, for example, instructions and data which cause a general-purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for archiving data records in an archive repository, the method comprising:
   modifying, by a content management server, a first data record;
   generating, by the content management server, a first change data record based on the modification of the first data record;
   selecting, by the content management server, a repository status;
   storing, by the content management server, the first change data record in a first repository based on the repository status,
   wherein the first repository is configured to store data records;
   determining, by the content management server, the first repository includes a first plurality of change data records that includes at least a first threshold number of change data records;
   determining, by the content management server, a second repository includes a second plurality of change data records that includes at least a second threshold number of change data records,
   wherein the second repository is configured to store data records, and wherein the first threshold number and the second threshold number are equal;
   retrieving, by the content management server and in response to: the first plurality of change data records of the first repository including at least the first threshold number of change data records and the second repository including the second plurality of change data records including at least the second threshold number of change data records, the second plurality of change data records of the second repository;
   generating, by the content management server, a plurality of change files,
   wherein each change file includes at least one change data record of the second plurality of change data records, and wherein the archive repository is configured to store data files;
   storing, by the content management server, the plurality of change files in the archive repository;
   selecting, by the content management server, the repository status;
   modifying, by the content management server, the repository status;
   modifying, by a content management server, a second data record;
   generating, by the content management server, a second change data record based on the modification of the second data record; and
   storing, by the content management server, the second change data record in the second repository based on the modified repository status.

2. The method of claim 1, further comprising:
   selecting, by the content management server, an archive index file from a third repository,
   wherein the third repository includes the repository status;
   modifying, by content management server, the archive index file based on the plurality of change files; and
   storing, by content management server, the modified archive index file in the third repository.

3. The method of claim 2, wherein the archive index file is modified to identify the at least one change data record in each change file.

4. The method of claim 3, wherein the archive index file is modified to identify an offset of the at least one change data record in each change file.

5. The method of claim 4, further comprising:
   receiving, by the content management server, a request for a third plurality of change data records;
   retrieving, by the content management server, the archive index file from the third repository;
   retrieving, by the content management server, at least one change file of the plurality of change files from the archive repository based on the archive index file and the request;
   extracting, by the content management server, one or more changes data records from the retrieved at least one change file based on the archive index file and the request; and
   outputting, by the content management server, the extracted one or more change data records.

6. The method of claim 1, wherein the first threshold number and the second threshold number are each inclusively between 20 million and 30 million.

7. The method of claim 1, wherein the first change data record includes a user identifier associated with the modification of the first data record and a time associated with the modification of the first data record, wherein the first change record identifies the first data record, wherein the second change data record includes a user identifier associated with the modification of the second data record and a time associated with the modification of the second data record, and wherein the second change data record identifies the second data record.

8. The method of claim 1, wherein each change file includes only change data records associated with a specific period of time, and wherein the specific period of time is at least one of: a day, a week, or a month.

9. The method of claim 1, wherein the first repository and the second repository are each relational databases configured to store data records, and wherein the archive repository is an object storage repository configured to store data files.

10. The method of claim 9, wherein the archive repository is at least one of: an Amazon S3® data bucket repository, a Microsoft Azure® blob storage repository, a Rackspace Cloud® file repository, and a Google Cloud® storage repository.

11. The method of claim 1, further comprising:
    deleting, by the content management server and in response to storing the plurality of change files in the archive repository, the second plurality of change data records from the second repository.

12. A method for archiving a plurality of data records in an archive repository, the method comprising:
    modifying, by a content management server, a first data record;
    generating, by the content management server, a first change data record based on the modification of the first data record,
    wherein the first change data record includes a user identifier associated with the modification of the first data record and a time associated with the modification of the first data record, and wherein the first change record identifies the first data record;
    storing, by the content management server, the first change data record in a first repository,
    wherein the first repository is configured to store data records;
    determining, by the content management server, the first repository includes a first plurality of change data records that includes at least a first threshold number of change data records;
    determining, by the content management server, a second repository includes a second plurality of change data records that includes at least a second threshold number of change data records,
    wherein the second repository is configured to store data records, and wherein the first threshold number and the second threshold number are equal;
    retrieving, by the content management server and in response to: the first plurality of change data records of the first repository including at least the first threshold number of change data records and the second repository including the second plurality of change data records including at least the second threshold number of change data records, the second plurality of change data records of the second repository;
    generating, by the content management server, a plurality of change files,
    wherein each change file includes at least one change data record of the second plurality of change data records, and wherein the archive repository is configured to store data files;
    storing, by the content management server, the plurality of change files in the archive repository;
    modifying, by the content management server, a second data record;
    generating, by the content management server, a second change data record based on the modification of the second data record,
    wherein the second change data record includes a user identifier associated with the modification of the second data record and a time associated with the modification of the second data record, and wherein the second change data record identifies the second data record; and
    storing, by the content management server, the second change data record in the second repository.

13. The method of claim 12, further comprising:
    selecting, by the content management server, a repository status; and
    storing, by the content management server, the first change data record in the first repository based on the repository status.

14. The method of claim 12, further comprising:
    selecting, by the content management server, a repository status;
    modifying, by the content management server, the repository status; and
    storing, by the content management server, the second change data record in the second repository based on the modified repository status.

15. The method of claim 14, further comprising:
    selecting, by the content management server, an archive index file from a third repository,
    wherein the third repository includes the repository status;
    modifying, by content management server, the archive index file based on the plurality of change files; and
    storing, by content management server, the modified archive index file in the third repository.

16. The method of claim 15, wherein the archive index file is modified to identify the at least one change data record in each change file.

17. The method of claim 12, wherein the first threshold number and the second threshold number are each inclusively between 20 million and 30 million.

18. The method of claim 12, wherein each change file includes only change data records associated with a specific period of time, and wherein the specific period of time is at least one of: a day, a week, or a month.

19. The method of claim 18, wherein the specific period of time is a day, wherein the plurality of change files includes a first change file associated with a first day and a second change file associated with a second day, wherein the first change file includes at least one data record associated with the first day, and the second change file includes at least one data record associated with the second day.

20. The method of claim 12, wherein the archive repository is at least one of: an Amazon S3® data bucket repository, a Microsoft Azure® blob storage repository, a Rackspace Cloud® file repository, and a Google Cloud® storage repository.

* * * * *